(12) United States Patent
Cook

(10) Patent No.: US 8,141,183 B2
(45) Date of Patent: Mar. 27, 2012

(54) METHOD FOR MANUFACTURING A PREFABRICATED MODULAR SHOWER CURB AND ASSOCIATED MODULAR SHOWER CURB

(76) Inventor: Joseph R. Cook, Parkland, FL (US)

( * ) Notice: Subject to any disclaimer, the term of this patent is extended or adjusted under 35 U.S.C. 154(b) by 1348 days.

(21) Appl. No.: 11/724,914

(22) Filed: Mar. 17, 2007

(65) Prior Publication Data
US 2008/0222796 A1 Sep. 18, 2008

(51) Int. Cl.
A47K 3/00 (2006.01)

(52) U.S. Cl. .......................................... 4/613

(58) Field of Classification Search .............. 4/612–614, 4/596
See application file for complete search history.

(56) References Cited

U.S. PATENT DOCUMENTS

| | | |
|---|---|---|
| 845,526 A | 2/1907 | Collins |
| 1,017,167 A | 2/1912 | Pleins |
| 1,684,503 A | 9/1928 | Nilson |
| 1,873,424 A | 8/1932 | Kerr et al. |
| 2,025,814 A | 12/1935 | Goss |
| 2,055,173 A | 9/1936 | Deubelbelss |
| 2,197,874 A | 4/1940 | Myers |
| 2,400,683 A | 9/1944 | Burnett |
| 2,389,724 A | 11/1945 | Falco |
| 2,394,594 A | 2/1946 | Cohn |
| 2,449,323 A | 9/1948 | Richterkessing |
| 2,467,074 A | 4/1949 | Birdwell et al. |
| 2,757,385 A | 8/1956 | Whittick |
| 2,838,830 A | 4/1957 | Norman |
| D206,220 S | 11/1966 | Flores |
| 3,363,267 A | 1/1968 | Kaiser et al. |
| 3,501,879 A | 3/1970 | Mitchell et al. |
| 3,551,918 A | 1/1971 | Bergmark |
| 3,606,617 A | 9/1971 | Frazier |
| 3,675,384 A | 7/1972 | Knecht |
| 3,800,335 A | 4/1974 | Buonaura |

(Continued)

FOREIGN PATENT DOCUMENTS

EP 0333168 9/1989

(Continued)

OTHER PUBLICATIONS

T. Clear Corporation; Finpan Concrete Backer Board; Preformed Bathroom Components; http://finpan.com/utilacrete/performed.html; Sep. 20, 2006; 3 pages.

(Continued)

Primary Examiner — Lori Baker
(74) Attorney, Agent, or Firm — Kevin P. Crosby; GrayRobinson, P.A.

(57) ABSTRACT

A prefabricated modular curb suitable for attaching to a sidewall of a prefabricated shower module for constructing a tiled shower includes a mounting wall, an exterior wall, and a top wall extending from the upper edge of the exterior wall to the upper edge of the mounting wall in a plane substantially perpendicular to the mounting wall and to the exterior wall, or pitched downward from the exterior wall toward the mounting wall. In one embodiment, the modular curb further includes at least one reinforcing curb rib connected to the top wall, the mounting wall, and/or the exterior wall. In another embodiment the top wall terminates beyond the outer surface of the mounting wall in a ledge having a width substantially equal to the width of the sidewall of the shower module.

22 Claims, 24 Drawing Sheets

U.S. PATENT DOCUMENTS

| | | | |
|---|---|---|---|
| 3,992,825 A | | 11/1976 | May |
| 4,067,072 A | | 1/1978 | Izzi |
| 4,146,939 A | | 4/1979 | Izzi |
| D255,829 S | | 7/1980 | Swenson |
| 4,423,528 A | | 1/1984 | Wiedmeier |
| 4,462,123 A | | 7/1984 | Morris et al. |
| 4,486,468 A | * | 12/1984 | Gray ............................ 427/181 |
| 4,541,132 A | | 9/1985 | Long |
| 4,557,004 A | * | 12/1985 | Piana ............................ 4/613 |
| 4,561,134 A | | 12/1985 | Mathews et al. |
| 4,694,513 A | | 9/1987 | Kizlah |
| 4,910,811 A | | 3/1990 | Izzi, Sr. |
| 4,938,825 A | * | 7/1990 | Macdonald .................. 156/245 |
| 4,974,269 A | | 12/1990 | Baus |
| 4,987,619 A | | 1/1991 | Smith |
| 4,993,087 A | | 2/1991 | Roquebrune |
| 4,993,201 A | | 2/1991 | Bunyard |
| 5,090,068 A | | 2/1992 | Zellner |
| 5,092,002 A | | 3/1992 | Powers |
| 5,115,604 A | * | 5/1992 | Bunyard ........................... 52/34 |
| 5,159,723 A | | 11/1992 | Benedict |
| D335,336 S | | 5/1993 | Stiefel |
| 5,224,224 A | | 7/1993 | Hintz et al. |
| 5,243,798 A | | 9/1993 | Elliot |
| 5,289,599 A | * | 3/1994 | Hintz et al. ....................... 4/613 |
| 5,299,330 A | | 4/1994 | Moore et al. |
| D349,950 S | | 8/1994 | Cummings |
| D351,019 S | | 9/1994 | Moore et al. |
| 5,371,980 A | | 12/1994 | Dix |
| D354,117 S | | 1/1995 | Nations |
| 5,435,021 A | | 7/1995 | Williams |
| D363,342 S | | 10/1995 | Dannenberg et al. |
| D367,522 S | | 2/1996 | Debs |
| 5,718,008 A | | 2/1998 | Pane |
| D392,724 S | | 3/1998 | Lenardon |
| 5,845,347 A | | 12/1998 | Young |
| 5,913,777 A | | 6/1999 | Gerber |
| D414,850 S | | 10/1999 | McKeone |
| 6,003,169 A | | 12/1999 | Davis, Jr. |
| 6,058,659 A | | 5/2000 | Astrom |
| 6,094,757 A | | 8/2000 | Torres |
| 6,155,015 A | | 12/2000 | Kirby |
| 6,175,971 B1 | | 1/2001 | O'Neil |
| 6,178,571 B1 | | 1/2001 | McAllister |
| 6,240,578 B1 | | 6/2001 | Planella |
| 6,381,773 B1 | | 5/2002 | McAllister |
| 6,571,406 B2 | | 6/2003 | Gerloff |
| D480,455 S | | 10/2003 | Painter et al. |
| 6,643,863 B1 | * | 11/2003 | Gerber ............................ 4/613 |
| 6,698,037 B2 | | 3/2004 | Lippé |
| 6,725,470 B2 | | 4/2004 | Webb |
| 6,735,793 B2 | | 5/2004 | Peterson |
| 6,766,545 B2 | | 7/2004 | Hodges |
| D495,787 S | | 9/2004 | Helmetsie et al. |
| 6,851,133 B1 | | 2/2005 | Nehring |
| 6,990,695 B2 | | 1/2006 | Grayson |
| 7,007,315 B2 | | 3/2006 | Stonecipher |
| 7,028,349 B2 | | 4/2006 | Helmetsie et al. |
| 7,100,331 B2 | | 9/2006 | Nehring |
| 7,296,309 B2 | | 11/2007 | Nehring |
| 2001/0052148 A1 | | 12/2001 | Hasenkopf |
| 2002/0066140 A1 | | 6/2002 | Gerloff |
| 2003/0033668 A1 | | 2/2003 | Pane |
| 2003/0089059 A1 | * | 5/2003 | Kirby .............................. 52/265 |
| 2004/0034922 A1 | | 2/2004 | Grayson |
| 2004/0237187 A1 | | 12/2004 | Stonecipher |
| 2005/0028270 A1 | | 2/2005 | Nehring |
| 2005/0050628 A1 | | 3/2005 | Mascheroni |
| 2005/0081290 A1 | | 4/2005 | Stimpson |
| 2006/0026752 A1 | | 2/2006 | Torres |
| 2006/0213006 A1 | | 9/2006 | Rush, Jr. et al. |
| 2008/0222793 A1 | | 9/2008 | Cook |
| 2008/0222794 A1 | | 9/2008 | Cook |
| 2008/0222795 A1 | | 9/2008 | Cook |
| 2008/0222796 A1 | | 9/2008 | Cook |
| 2008/0222797 A1 | | 9/2008 | Cook |
| 2008/0222891 A1 | | 9/2008 | Cook |
| 2008/0229494 A1 | | 9/2008 | DeGooye et al. |
| 2009/0241258 A1 | | 10/2009 | Cook |
| 2010/0263188 A1 | | 10/2010 | Cook |

FOREIGN PATENT DOCUMENTS

| | | | |
|---|---|---|---|
| FR | 2701828 | | 9/1994 |
| GB | 2093342 A | | 9/1982 |
| GB | 2108382 A | | 5/1983 |
| GB | 2270836 A | | 3/1994 |
| GB | 2271713 A | | 4/1994 |
| JP | 53036570 | | 4/1978 |
| JP | 54038649 A | | 3/1979 |
| JP | 5017981 A | | 1/1993 |
| JP | 5017982 A | | 1/1993 |
| JP | 2005187138 A | | 7/2005 |
| WO | WO 98/51202 | * | 11/1998 |
| WO | WO 2008/115467 A2 | | 9/2008 |

OTHER PUBLICATIONS

Custom size Corian and Acrylic shower bases and shower surrounds made to any size, shape, and drai . . . ; 1 page ; KBRS Manufacturing, Inc., The Perfect Fit; http://showerbase.com/ ; Sep. 20, 2006.

Bonsal American—Tile Products; http://www.bonsal.com/tileproducts_view.html?id=Qq46YHV5eng%3D ; Sep. 16, 2006; 5 pages.

International Search Report and Written Opinion for International Application No. PCT/US08/003490 dated Oct. 21, 2008 (12 pages).

International Search Report and Written Opinion dated Aug. 23, 2010 issued by the Korean Intellectual Property Office as International Searching Authority in connection with International Application No. PCT/US2010/001313 (9 pages).

* cited by examiner

METHOD FOR MANUFACTURING A PREFABRICATED MODULAR SHOWER CURB AND ASSOCIATED MODULAR SHOWER CURB

CROSS-REFERENCE TO RELATED APPLICATIONS

The present patent application is related to co-pending and commonly owned U.S. patent application Ser. No. 11/724,873, entitled "Ribbed Prefabricated Polyurethane Shower Module,"; U.S. patent application Ser. No. 11/725,113, entitled "Prefabricated Shower Pan Having Varying Sidewall Heights and Method of Attaching a Modular Curb Thereto," U.S. patent application Ser. No. 11/724,912, entitled "Improved Drain Wall for a Prefabricated Shower Module," U.S. patent application Ser. No. 11/725,112 "Method for Manufacturing a Prefabricated Shower Module"; and U.S. patent application Ser. No. 11/724,913, entitled "Method of Manufacturing and Installation of Prefabricated Shower Bench and Associated Shower Bench," filed on even date with the present patent application, the entire teachings of which being hereby incorporated by reference

BACKGROUND OF THE INVENTION

1. Field of the Invention

The present invention relates generally to prefabricated shower modules and, more particularly, a method for manufacturing a prefabricated modular shower curb for use in constructing a tiled shower enclosure and the associated modular shower curb.

2. Description of the Prior Art

Most tile-covered shower enclosures are created using complicated construction methods. For example, using conventional techniques, a skilled installer frames out the area to be enclosed using two-by-four wooden or aluminum studs to create a frame and curb. Felt or tar paper is then laid over a subfloor area enclosed within the newly formed frame. A flexible, leak-proof liner is installed on top of the felt or tar paper and attached to the frame. Next, the installer attaches dry wall boards to the framing studs, creating shower sidewalls. A hole is cut in the liner to allow for a drain, and a layer of mortar is applied to the shower sidewalls and curb and allowed to cure. Additional mortar is applied on top of the leak-proof liner and hand-shaped to form a shower floor which slopes toward the drain such that water from the shower flows toward the drain. After the mortar has cured, shower tile is applied to the sidewalls and floor to create the finished enclosure.

The process of creating the enclosed shower is time-consuming and requires a certain degree of skill in order to maintain the proper pitch and uniformity in shaping the floor. Irregularities in the pitch of the floor can cause water from the shower not to drain properly or make tiling the shower enclosure difficult. The liners are also susceptible to punctures or leaks and may be difficult for the installer to properly form square corners at the intersection of the shower sidewalls and floor. Additionally, the mortar layer used to create the floor is necessarily thick in order to form a sloped surface, therefore the time required for the floor to cure before applying tile may be quite long (e.g., greater than 24 hours).

In recent years, the process of shower installation has been vastly improved by the introduction of prefabricated shower base modules used for forming the floor. Use of the prefabricated modules significantly decreases the amount of time and skill required to construct a tile-covered shower enclosure, as well as providing more of a consistent and reliable flooring surface upon which to tile. These modules are pre-constructed molded units having a sloping floor, an integrated drain, curb, sidewalls, and a horizontal surface on the top of each sidewall for mounting drywall such that the drywall is substantially flush to the module sidewalls. Installation of the module involves securing a section of drain pipe to the drain, applying adhesive and sealing material to the subfloor where the module will rest, and seating the module on the subfloor. Tile can then be applied directly to the shower walls and module without the need for first applying mortar.

However, these prefabricated shower modules contain weaknesses in the design which add cost to the final product. For instance, certain modules are manufactured using plastics-forming processes that inject molten polymeric resins into molds. After filling the mold with the resin, the module must cool (e.g., solidify) before being removed. If the module is removed before it is completely solid, bowing may occur as the module hardens. However, the mold or "tool" for creating each unit can be quite expensive, thus a manufacturer generally limits the number of tools for producing each module. Therefore, the number of modules manufactured in a given amount of time depends on the amount of time required for one module to sufficiently cool enough to be removed from the mold.

Because the mold is needed to create other modules, the manufacturer is pressed to find ways to decrease the required cooling time. This problem is exacerbated by non-uniform thicknesses of the plastic material throughout the module. Cooling rates for thick areas of the module are slower than for thinner areas. Thus, if the module is removed from the mold before it is completely cooled, areas of the modules having different thicknesses cool at different rates, resulting in bowing across the surface of the floor As a result, severely bowed modules must be discarded, increasing the unit cost for other modules. Additionally, slightly bowed modules present potential field problems (i) by impacting uniform tile adhesion on the upper surface of the floor of the shower module, (ii) by preventing the lower surface of the floor of the shower module from sitting flush on the subfloor, and (iii) by changing the pitch of the upper floor of the shower module, which causes puddling or ponding of water on the upper floor of the shower module rather than properly pitched draining. Further, uneven cooling along the drain aperture may result in a misshapen aperture, thereby (i) preventing the installer from acquiring (or hampering his/her ability to acquire) a water-tight seal around the drain fixture, and (ii) interfering with the insertion of the drain fixture into the drain aperture. Uneven cooling along the drain assembly (i) may prevent a proper connection (e.g., a water-tight connection) between the drain assembly and the shower module, (ii) may warp the drain aperture at the top of the drain assembly, thereby interfering with the insertion of the drain top into the top of drain assembly, and (iii) may warp the drain aperture in the bottom of the drain assembly, thereby interfering with the connection of the drain assembly to the plumbing line.

Further, each size module requires a specific mold, thus the manufacturer is forced to limit the selection of available modules to a few standard sizes. Because the curb may be integrated into the shower module, both the positioning of the curb, as well as the overall dimensions of the module are set by a single tool. The design options for a customer (e.g., an architect, a designer, a contractor, an installer, or homeowner) desiring to implement a prefabricated shower module are therefore limited to a few set arrangements.

Additionally, features such as shower benches or ledges must still be constructed by hand, or added in a piece-meal fashion, thereby compromising the leak-proof integrity of the prefabricated shower module.

Therefore, a need exists for, among other things, a method for manufacturing a prefabricated modular shower curb for use in constructing a tiled shower enclosure and the associated modular shower curb, to overcome the shortcomings of the prior art.

DETAILED DESCRIPTION OF EXEMPLARY EMBODIMENT(S)

Figure 1:
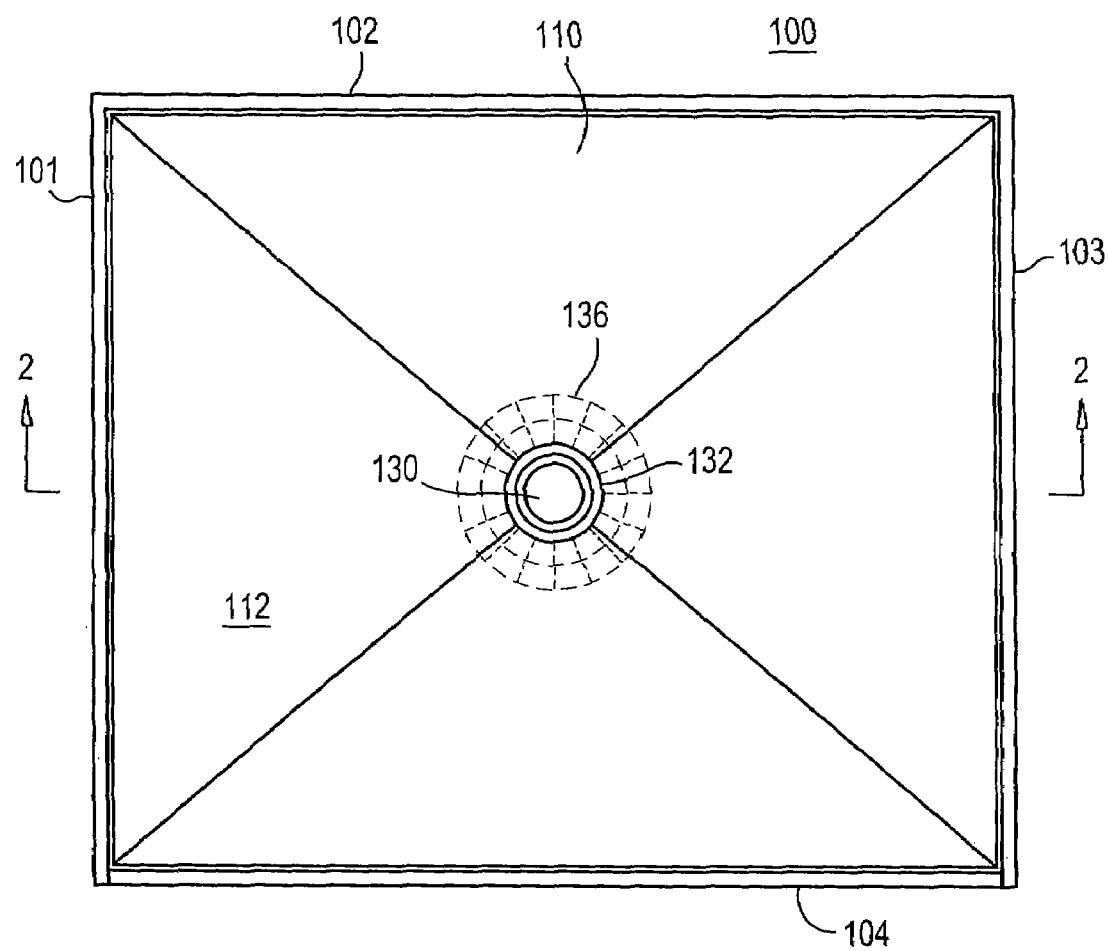
FIG. 1 is a top plan view of a prefabricated shower module in accordance with one embodiment of the present invention.

Before describing in detail exemplary embodiments that are in accordance with the present invention, it should be observed that the embodiments reside primarily in combinations of apparatus components and processing steps related to implementing a method for improving manufacturability of a pre-molded leak-proof shower module having surfaces for receiving shower tile or stone thereon and the associated shower module. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as "first" and "second," "top" and "bottom," and the like, may be used solely to distinguish one entity or element from another entity or element without necessarily requiring or implying any physical or logical relationship or order between such entities or elements. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element. The term "tile" also encompasses "stone" and/or "marble." The term "tiled" means any surface having tile, stone, and/or marble applied thereon. The term "sidewall," in relation to a shower module, means any vertical surface rising above the floor of the shower module along one or more peripheral edges and may be any height or any width, including, without limitation, an integrated curb.

Generally, the present invention encompasses a prefabricated modular system for constructing a tiled shower enclosure; an improved prefabricated shower module, modular curb, and shower seat for use within the system, and methods for manufacturing and installing the above components.

In a preferred embodiment, a prefabricated leak-proof shower module suitable for use in constructing a tiled shower includes a plurality of sidewalls, and a floor that is bounded along at least one peripheral edge by at least one sidewall that extends vertically from the peripheral edge. The floor has an upper surface sloping downward from each peripheral edge toward a drain aperture and a lower surface with a plurality of support ribs, where each support rib extends downward from the lower surface to terminate in a common horizontal plane. Additionally, the upper surface may contain a plurality of pitching ribs which provide a uniform pitch from each peripheral edge to the drain aperture. Each support rib runs and each pitching rib runs either parallel to, perpendicular to, or at an acute angle to, at least one peripheral edge of the floor. The shower module may be created using polyurethane reaction injection molding processing. Alternative embodiments may include a horizontal bottom plane and/or an integrated molded curb.

In another embodiment, a prefabricated modular curb suitable for use in constructing a tiled shower enclosure includes a mounting wall with an outer surface for engaging a sidewall of a shower module, an exterior wall, and a top wall that extends from an upper edge of the exterior wall to the upper edge of the mounting wall in a plane either substantially perpendicular to the mounting wall and to the exterior wall or pitching downward from the exterior wall to the mounting wall. The curb further includes at least one reinforcing curb rib that is attached to at least one of the top curb wall, the inner surface of the mounting wall, the inner surface of the exterior wall, and the bottom wall if any, and which rib runs either parallel to, perpendicular to, or at an acute angle to the mounting wall or the exterior wall.

In another embodiment, a prefabricated shower bench for installation in a tiled shower includes a seating surface having a plurality of peripheral edges, and at least three sidewalls, wherein each sidewall is connected to a corresponding peripheral edge of the seating along an upper edge. One of the sidewalls includes a setback area along its entire lower edge that has a height greater than the height of one of the sidewalls of a prefabricated shower module. The lower edge of each sidewall terminates in a common plane.

1. Prefabricated Shower Module

The present invention can be more readily understood with reference to FIGS. 1-32, in which like reference numerals designate like items. FIGS. 1-4 depict an exemplary prefabricated leak-proof shower module 100 suitable for use in constructing a tiled shower in accordance with one embodiment of the present invention. As depicted in FIGS. 1-4, the exemplary shower module 100 includes a floor 110, and vertical sidewalls 101, 102, 103, 104 (4 shown). The upper surface 112 of the floor 110 and the vertical sidewalls 101, 102, 103, 104 are suitable for retaining tile, stone, or marble installed thereon. Each sidewall 101, 102, 103, 104 extends vertically from a peripheral edge of the floor 110. The floor 110 has an upper surface 112 that slopes downward from each peripheral edge toward a drain aperture 130, and a lower surface 114 that connects to a plurality of support ribs 120. The upper surface 112 slopes downward from each peripheral edge to the drain aperture 130 at a pitch of ⅛"/foot or greater.

Each support rib 120 extends downward from the lower surface 114 such that the bottom edge 122 of each support rib 120 terminates in a common horizontal plane. Additionally, each support rib 120 runs either parallel to, perpendicular to, or at an acute angle to, at least one peripheral edge of the floor 110. When the shower module 100 is installed to construct a shower enclosure, the shower module 100 is positioned on a subfloor of the shower enclosure in such a manner that the plurality of support ribs 120 provide support for the shower module 110 by resting on the subfloor, and a drain wall 132 surrounding the drain aperture 130 is positioned inside or above an opening in the subfloor that contains a plumbing connection.

Figure 4:
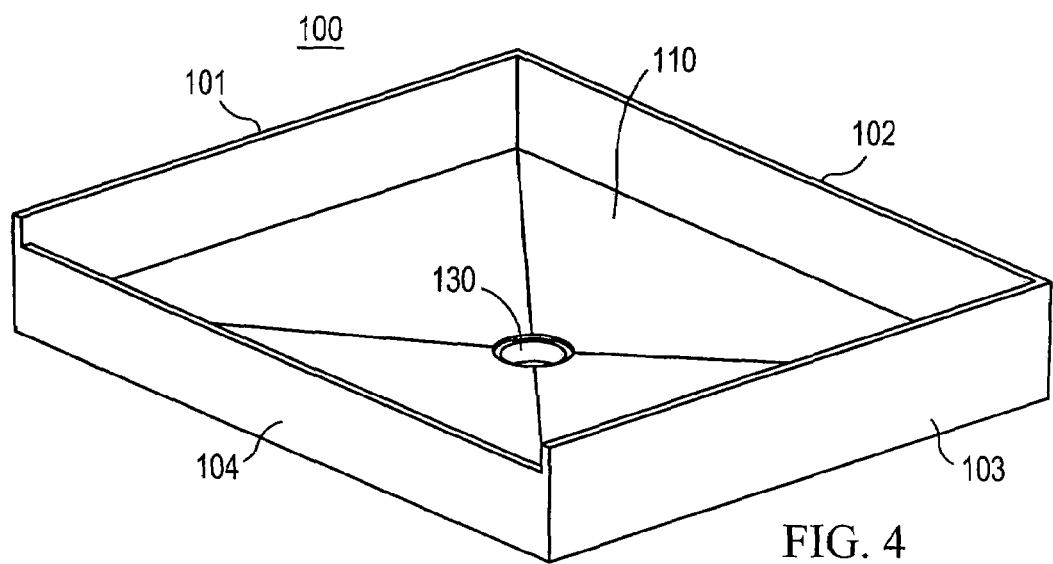
FIG. 4 is a front/top perspective view of the shower module of FIG. 1.
Figure 4A:
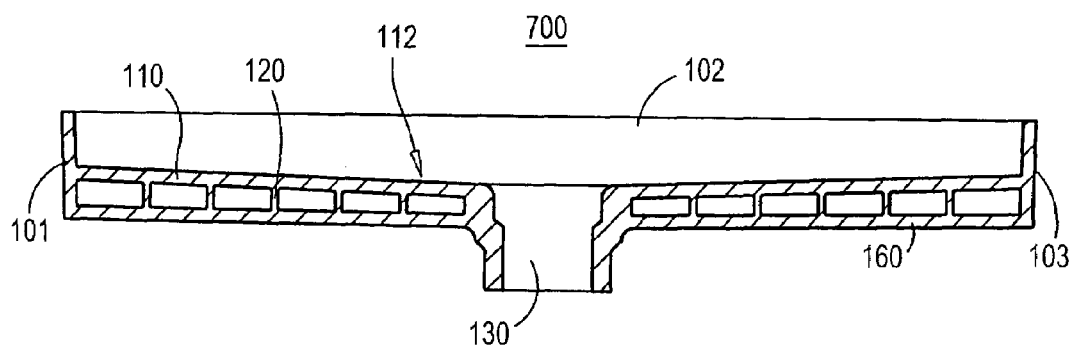
FIG. 4A is a front/top perspective view of a shower module in accordance with an alternative embodiment of the present invention.

In an alternative embodiment, as shown in FIG. 4A, the shower module 700 includes a bottom panel 160 that extends from each sidewall 101, 102, 103, 104 and/or each peripheral edge to the drain wall 132 in a horizontal plane. Thus, the bottom panel 160 rests on the subfloor of the shower enclosure when the shower module 100 has been installed. Additionally, the bottom edge 122 of each support rib 120 is connected to the bottom panel 160.

Figure 4B:
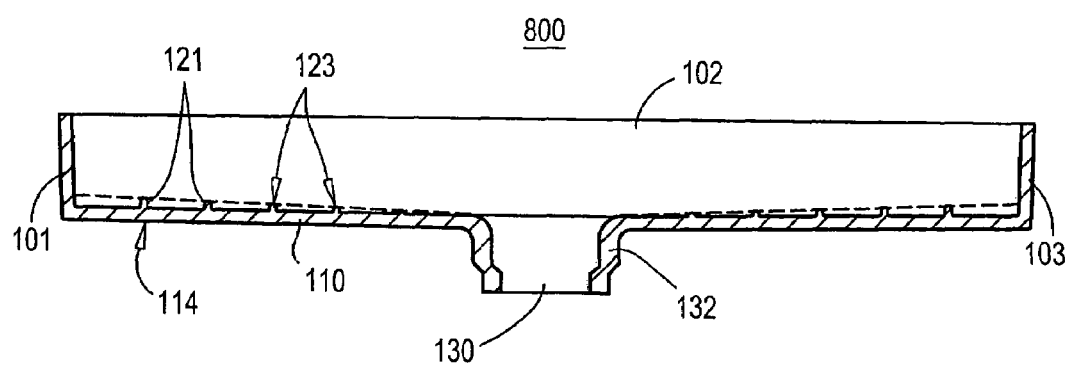
FIG. 4B is a front/top perspective view of a shower module in accordance with another alternative embodiment of the present invention.
Figure 5:
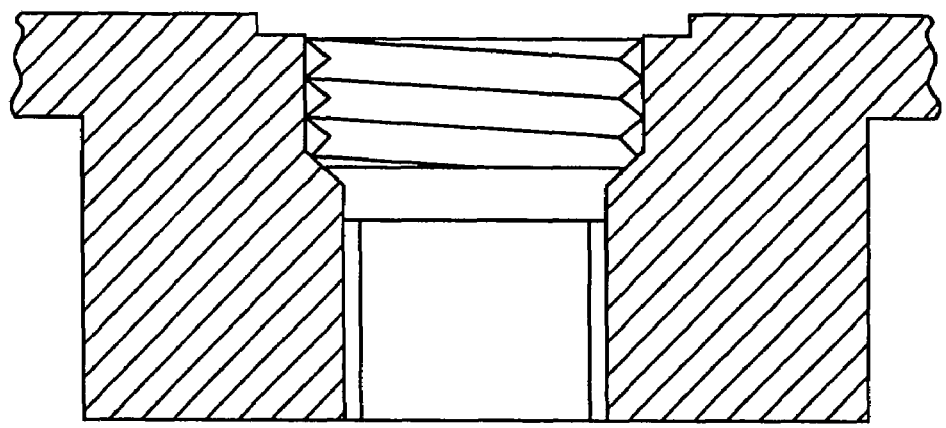
FIG. 5 is a cross-sectional view of a prior art shower module drain assembly.

In another alternative embodiment, as shown in FIG. 4B, the shower module 800 includes a floor 110 that extends in a horizontal plane from each sidewall 101, 102, 103, 104 and/or peripheral edge to a drain wall 132 surrounding the drain aperture 130. Pitching ribs 121 extend upwards from the upper surface 112 and terminate in an upper edge sloping downwards from the peripheral edge to the drain aperture 130.

In one embodiment, at least one sidewall 104 has a height that is lower than the height of the remaining sidewalls 101, 102, 103. The height of the lower sidewall 104 is preferably at least one inch lower than the height of the remaining sidewalls 101, 102, 103. The lowered height insures that in the event that the plumbing connection becomes clogged, any standing water in the shower module 100 will spill over onto the floor of the bathroom in which the shower enclosure is constructed instead of seeping into the walls; preventing water damage or mold accumulation. Additionally, the top surface of any sidewall 101, 102, 103, 104 should either be flat or pitched towards the shower module 100 so that any water accumulating on the top surface flows back into the shower module 100.

The height of the lower sidewall 104 is preferably sufficient to permit installation of a modular curb 300 (see FIG. 21) adjacent to the sidewall 104. The lower sidewall 104 may be initially molded to the required height, molded to the same height as the other sidewall 101, 102, 103 and trimmed as a part of post-production process, or may contain a horizontal fatigue line 108 (see FIG. 10) located at a height suitable for a portion of the sidewall 104 to be removed, thereby allowing installation of a modular curb adjacent to the sidewall. The horizontal fatigue line 108 denotes a thinner section of the sidewall 104 and can be easily broken, or cut, and removed. The fatigue line 108 may be molded into the sidewall during an injection molding process, or pre-scored by the manufacturer. The fatigue line 108 may be included on any or all of the sidewalls 101, 102, 103, 104 so that an installer may have the option of choosing a sidewall 101, 102, 103, 104 for attaching the prefabricated modular curb 300. After installation of tile on the surface of the shower module 100, any inherent weakness in a sidewall 101, 102, 103, 104 still containing a horizontal fatigue line 108 does not affect the integrity of the shower enclosure and is obscured by the tile.

In an alternative embodiment, the outer surface of the lower sidewall 104 may include an attachment mechanism 106 (see FIG. 23) for engaging a corresponding attachment mechanism 316 of a modular curb 300. Exemplary methods for attaching the modular curb 300 to the shower module 100 are discussed in greater detail in Section 2. The attachment mechanism 106 may be a tab, a notch, a slot, a tongue, a groove, a ridge, a peg, an aperture, an interlocking clip, an adhesive material, or any other mechanism suitable for connecting the modular curb 300 to the shower module 100.

In one embodiment of the present invention, the shower module 100 is constructed using polyurethane reaction injection molded processes. When using injection-molding techniques, the shower module 100 may be molded from a polymeric material such as polyurethane foam having a density equal to or greater than 12 pounds per cubic foot. A lower density polyurethane material would be, most likely, unable to support a connection to the drain.

The overall thickness of the material, as well as variances in the thickness of material used, has a substantial impact on the quality of the shower module 100, 700, 800. During manufacturing, the shower module 100, 700, 800 is formed by injecting a liquid polymeric material into a tool having a core and a cavity, which define the shape of the finished shower module 100, 700, 800. The core and cavity of the tool, when fastened together, form a hollowed area that corresponds to the final shower module 100, 700, 800. As the polymeric material cools, it conforms to the shape defined by the tool and solidifies into the final shower module 100, 700, 800. The thickness of the material affects the cooling rate of the finished product. Thicker sections cool at a slower rate than thinner sections. If a shower module 100, 700, 800 contains sections having an uneven thickness, the thinner sections will cool much more quickly than the thick sections, which may cause the upper surface and the lower surface of the shower module 100, 700, 800 to bow or warp.

The area surrounding the drain aperture 130 is of particular importance in the cooling process. In the drain area in previous prefabricated shower modules, such as the drain area shown in FIG. 5, the drain wall was maintained at a constant diameter below the bottom floor of the shower module, but smaller than the plumbing opening in the shower enclosure subfloor. The rational for shaping the drain wall in this fashion was that the constant diameter would provide a more secure fit, and would support the drain. However, by maintaining a constant outer diameter of the drain wall, the thickness of the drain wall surrounding the drain aperture or the drain assembly varies as the depth of the drain wall increases from the top of the drain aperture or drain assembly to the bottom of the drain aperture or drain assembly, because the diameter of the drain aperture or drain assembly at the top of the drain aperture or drain assembly is larger than the diameter at the bottom. Because of the difference in material thickness in the drain wall, the thinner areas cooled faster than the thicker areas.

This cooling differential resulted in bowing and warping in one or more of the upper surface in the vicinity of the drain wall, the lower surface in the vicinity of the drain wall, the drain aperture, the drain assembly, and the drain aperture inside the drain assembly, thereby (i) causing problems with the pitch of the upper surface, (ii) impacting tile adhesion to the upper surface, (iii) impacting the water tightness of the seal between the drain fixture (not shown) and the drain aperture at or around the upper surface, the drain fixture and the drain aperture at or around the lower surface, and the drain fixture and the inside of the drain aperture, (iv) impacting whether the lower surface of the shower module is level around the drain wall, (v) impacting the top and bottom shape of the drain aperture thereby interfering with the insertion of a drain fixture into the drain aperture, and (vi) impacting the shape of the drain aperture inside the drain assembly thereby interfering with the connection of the drain assembly to the plumbing line and the insertion of the drain top into the drain assembly.

Figure 2:
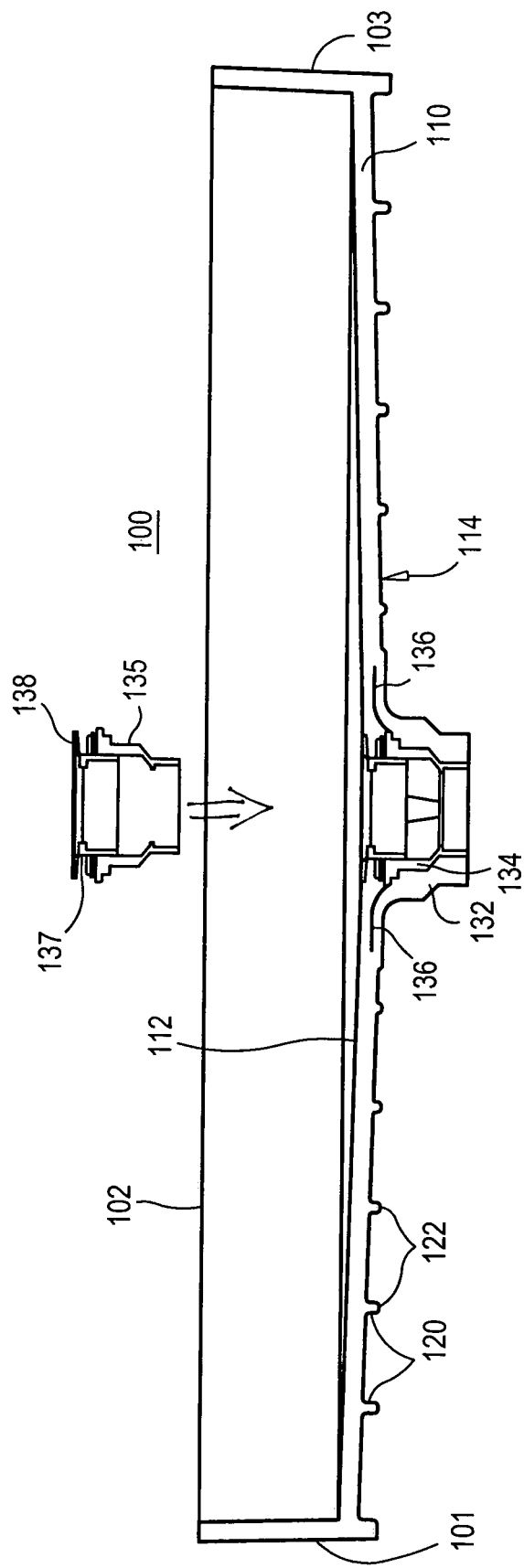
FIG. 2 is a side cross-sectional elevational view of the prefabricated shower module of FIG. 1 along the line 2-2.
Figure 3:
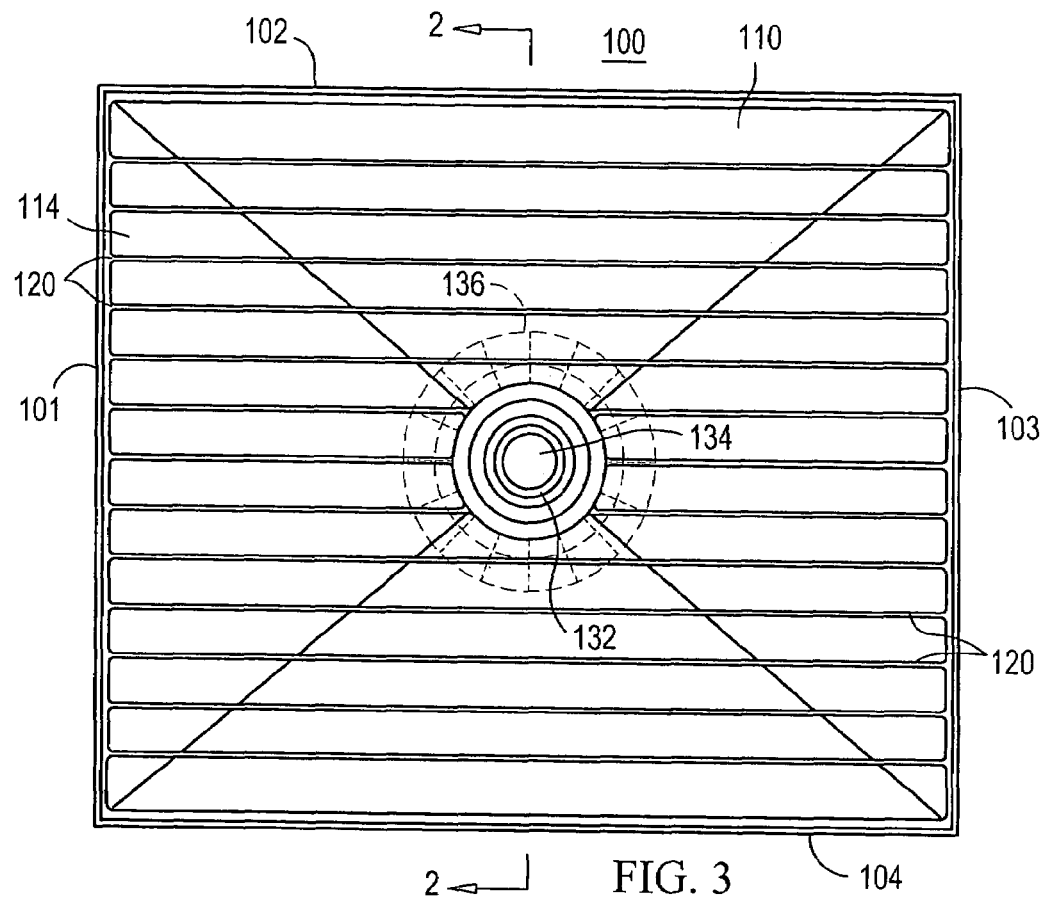
FIG. 3 is a bottom plan view of the prefabricated shower module of FIG. 1, illustrating a horizontal support rib arrangement.

As shown in FIG. 2, a drain may be attached to the shower module 100, 700, 800 at the drain aperture 130 in one of two methods. The shower module 100, 700, 800 may be molded with a prefabricated drain assembly 134 integrated into the shower module floor 110 and encased inside the drain wall 132, or with a drain fixture 135 affixed to the shower module 100 after fabrication of the shower module 100 by inserting the drain fixture 135 into the drain aperture 130 molded into the shower module floor 110 and drain wall 132. When the drain fixture 135 is attached to the shower module 100 subsequent to fabrication, a water-tight seal must be established between the drain fixture 135 and the shower module 100 at one or more of the drain aperture 130, the upper surface 112, and the lower surface 114, to prevent leaking.

Figure 6:
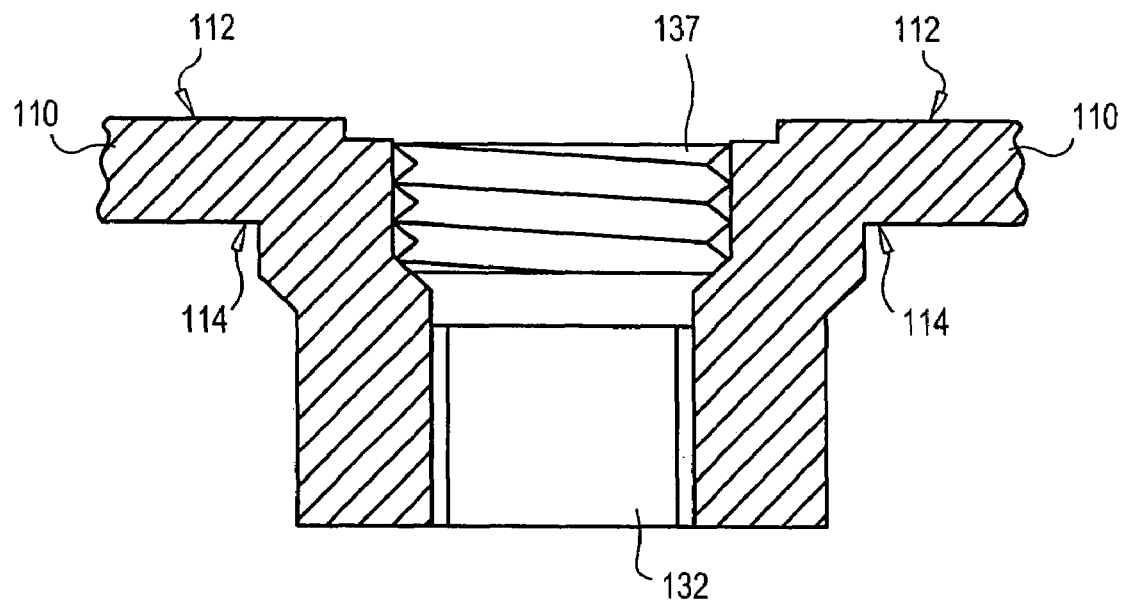
FIG. 6 is a cross-sectional view of an exemplary drain assembly, in accordance with an embodiment of the present invention.
Figure 7:
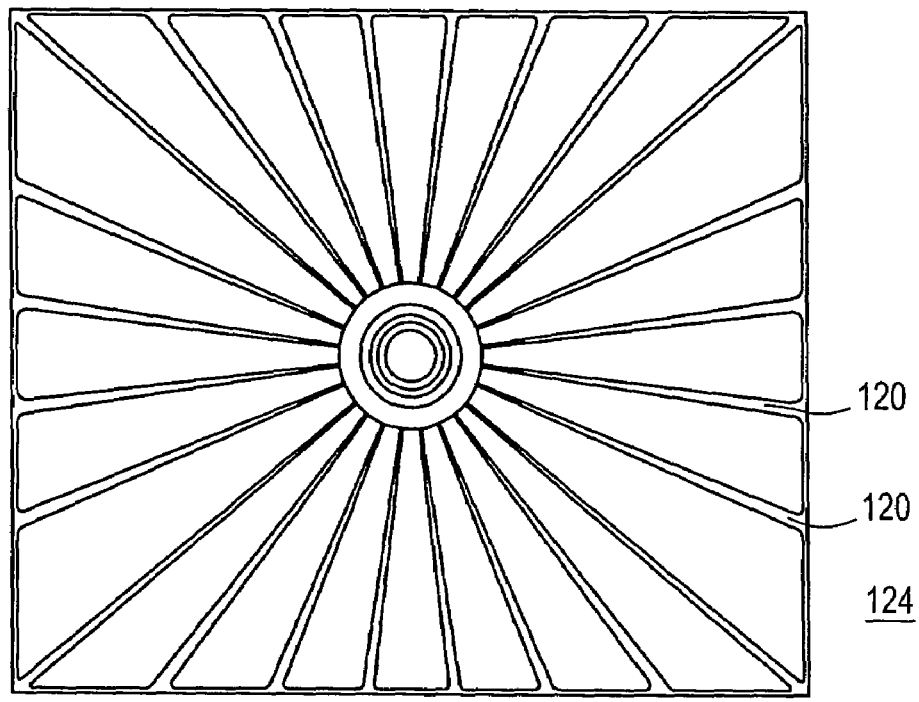
FIG. 7 is a bottom plan view of a prefabricated shower module, illustrating an exemplary sunburst support rib arrangement, in accordance with an alternative embodiment of the present invention.
Figure 8:
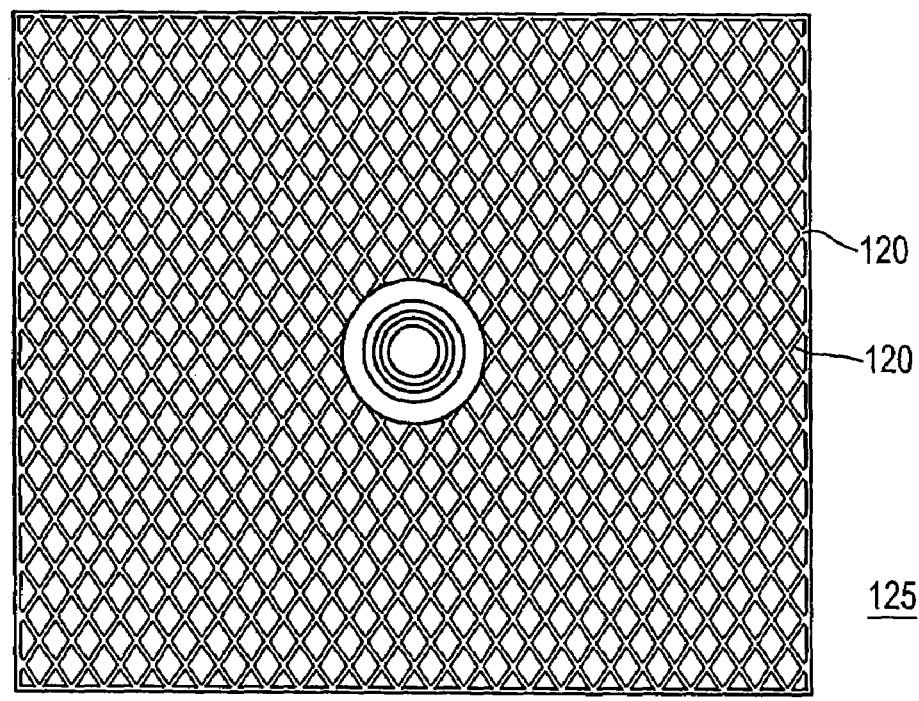
FIG. 8 is a bottom plan view of a prefabricated shower module, illustrating an exemplary diamond support rib arrangement, in accordance with an alternative embodiment of the present invention.
Figure 9:
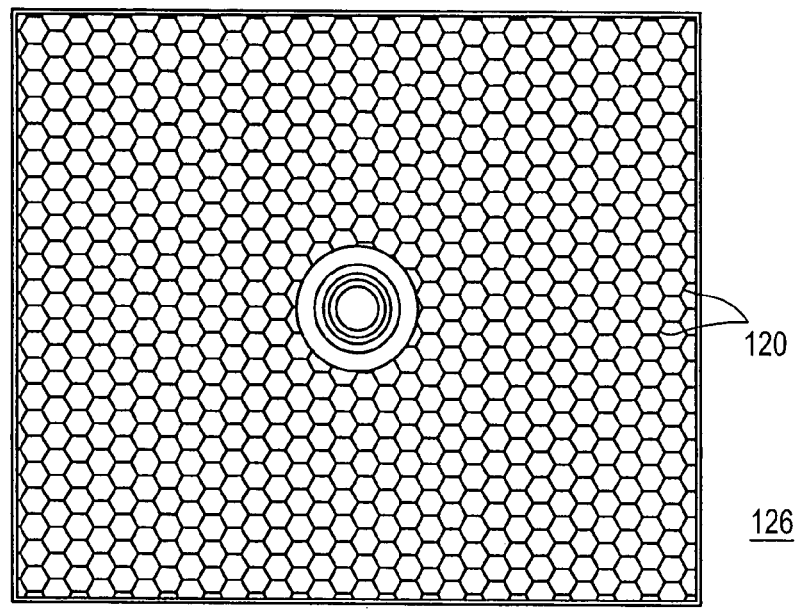
FIG. 9 is a bottom plan view of a prefabricated shower module, illustrating an exemplary honeycomb support rib arrangement, in accordance with another alternative embodiment of the present invention.
Figure 10:
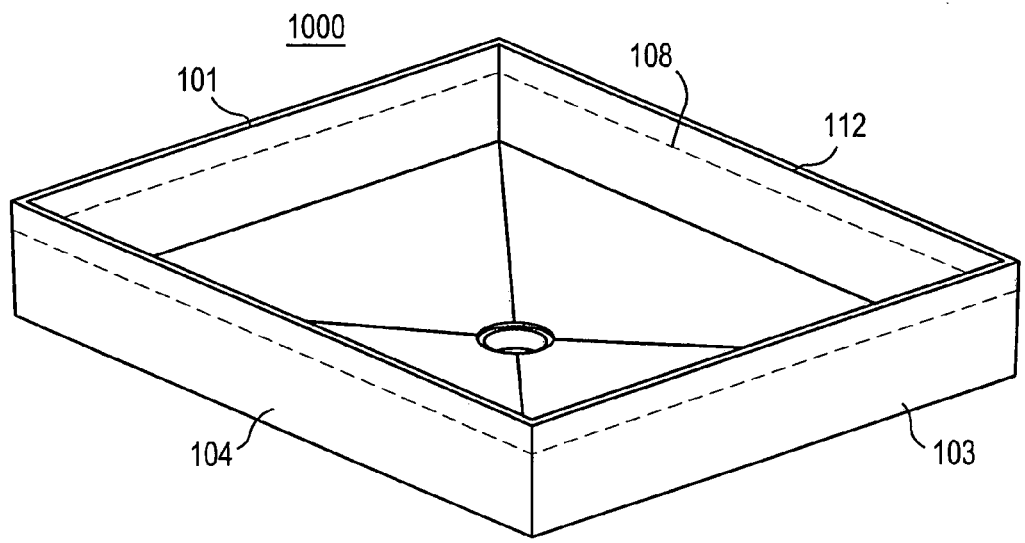
FIG. 10 is a front/top perspective view of a prefabricated shower module having pre-scored indentations for attaching a modular curb along any sidewall, in accordance with another alternative embodiment of the present invention.

In an embodiment of the present invention, as shown in FIG. 6, the drain wall 132 surrounding the drain assembly 134 or the drain aperture 130 has a thickness that is contoured to approximate variances in the diameter of the drain assembly 134 or the drain fixture 135. The top of the drain aperture 130 and the drain assembly 134 may have a greater diameter than the bottom of the drain aperture 130 and the drain assembly 134, because the top portion of most drain fixtures and drain assemblies is wider where the water drains from the floor 110 of the shower module 100 into the drain assembly 134 or the drain fixture 135, than at the bottom portion of the drain fixture 135 and/or the drain assembly 134 where they connect to the plumbing line. Accordingly, the upper portion of the drain wall 132 may have a greater diameter than the lower portion of the drain wall 132, as the drain wall 132 is contoured to more closely and uniformly follow the diameter of the respective portions of the either drain assembly 134 or the drain aperture 130 used to connect a drain fixture 135.

The largest diameter of the drain wall 132 at the thickest part of the drain wall 132 is equal to or less than 4 times the diameter of the drain aperture 130 at the bottom of the drain wall. 130. The thickness of the bottom of the drain wall 132 measured from the outside wall of the bottom of the drain wall 132 to the drain aperture 130 at the bottom of the drain wall 132 is equal to or less than 1½ times the diameter of the drain aperture at the bottom of the drain wall. 130. The actual thickness of the drain wall 132, the thickness of the shower module floor 110 at the drain wall 132, the diameter of the drain wall 132, and the contour of the drain wall 132, will vary depending upon the size of the drain, the weight of the drain, the size of the drain aperture, and whether the drain is made of one or more of PVC, ABS, brass, copper, iron, or other metal. By adhering to the above guidelines, most instances of bowing or warping of the shower module floor 110, the drain wall 132, the drain assembly 134, and the drain aperture 130 may be significantly reduced.

If a prefabricated drain assembly 134 is integrated into the shower module floor 110, the prefabricated drain assembly 134 is inserted into the tool prior to injecting the polymeric material. A drain reinforcing structure 136, which has an opening in the center with a diameter that is slightly smaller than the outer diameter of the drain assembly 134, is placed over the drain assembly 134 in such a manner that edges of an interior diameter of the drain reinforcing structure 136 interfere with the outer diameter of the prefabricated drain assembly 134. The drain assembly 134 with the attached drain reinforcing structure 136 is then placed inside the tool such that it lies in a horizontal plane in an intermediary position between the cavity and the core of the tool. The polymeric material surrounds the drain assembly 134 and the drain reinforcing structure 136 when injected into the tool, thereby permanently embedding the drain assembly 134 with the attached drain reinforcing structure 136 within the floor 110 of the shower module 100 and integrating the prefabricated drain assembly 134 within the shower module 100. The prefabricated drain assembly 134 may be any PVC, ABS, brass, copper, iron, or metal drain assembly designed to be coupled with any standard sized drain pipe. The drain reinforcing structure 136 may be mesh, solid, or porous, and made from wire, metal, fiberglass, plastic, polymers, or any combination of the foregoing. The density, thickness, size and shape of the drain reinforcing structure 136 will vary depending on the size, weight, drain aperture, and material of the drain assembly 134.

Both the prefabricated drain assembly 134 and the drain fixture 135 subsequently attached to the drain aperture 130 may contain a male drain top which is inserted into a female drain either by pushing down or screwing down the male drain top into the female drain top. The male drain top may also be connected to a detachable drain screen 138 covering an aperture in the center of the male drain top. The detachable drain screen 138 may have the form of any geometric shape (e.g., circular, oval, square, rectangular, diamond, etc.). When the shower module 100, 700, 800 has been covered by tile, the male drain top with the drain screen 138 attached may either rest slightly below the surface of the tile or be substantially flush with the tile. Upon installation, the tile is cut to conform to the shape of the detachable drain screen 138. The male drain top is lowered to the height of the tile or just below the tile height, and then the detachable drain screen 138 is attached to the top of the drain in a manner to conform to the drain screen shape formed by the installed tile. The height of the male drain top may be adjusted for use with tile of any thickness.

Any bowing or warping of the shower module 100, 700, 800, the drain aperture 130, or the drain assembly 134 creates problems in (i) attempting to properly seal the connection between the drain fixture 135 or the drain assembly 134 and the drain wall 132, (ii) attempting to adhere the tiles to the upper surface 112 of the shower module 100, 700, 800, (iii) attempting to connect the drain fixture 135 or the drain assembly 134 to a plumbing line, (iv) attempting to lower a male drain top into the female drain top of the drain assembly 134, (v) attempting to insert the drain fixture 135 into the drain aperture 130, (vi) attempting to have the lower surface 114 of the shower module floor 110 sit level on the subfloor once the drain wall 132 or drain fixture 135 is inserted into the opening in the subfloor, and (vii) maintaining a constant pitch and proper drainage of the upper surface 112 of the shower module floor 110 to the drain aperture 130. Thus, to insure even cooling, it is important that the overall thickness of material be kept within certain limits. For example, the vertical distances in each of the four situations described below should be four inches or less:

(i) From the bottom edge 122 of each support rib 120 on the lower surface 114 to the upper surface 112 of the floor 110;

(ii) From the bottom edge 122 of each support rib 120 on the lower surface 114 to the top edge 123 of each pitching rib 121 on the upper surface 112 of the floor 110;

(iii) From the lower surface of the bottom panel 160 to the top edge 123 of each pitching rib 121 on the upper surface 112 of the floor 110; and (iv) From the lower surface of the bottom panel 160 to the upper surface 112 of the floor 110.

Additionally, the difference between any two vertical distances described in each of the four (4) following situations should be three inches or less:

(i) The largest vertical distance from the bottom edge 122 of any portion of any support rib 120 on the lower surface 114 of the floor 110 to the upper surface 112 of the floor 110, and the shortest vertical distance from the bottom edge 122 of any portion of any support rib 120 on the lower surface 114 of the floor 110 to the upper surface 112 of the floor 110;

(ii) The largest vertical distance from the bottom edge 122 of any portion of any support rib 120 on the lower surface 114 of the floor to the top edge 123 of any pitching rib 121 on the upper surface 112 of the floor 110, and the shortest distance from the bottom edge 122 of any portion of any support rib 120 on the lower surface 114 of the floor 110 to the top edge 123 of any pitching rib 121 on the upper surface 112 of the floor 110;

(iii) The largest vertical distance from the lower surface of bottom panel 160 to the upper surface 112 of the floor 110, and the shortest vertical distance from the lower surface of the bottom panel 160 to the upper surface 112 of the floor 110; and (iv) The largest vertical distance from the lower surface of bottom panel 160 to the top edge 123 of any pitching rib 121 on the upper surface 112 of the floor 110, and the shortest vertical distance from the lower surface of the bottom panel 160 to the top edge 123 of any pitching rib 121 on the upper surface 112 of the floor 110.

The thickness of any sidewall 101, 102, 103, 104 should be equal to or greater than ⅜ inches to insure that the polymeric material properly flows throughout the cavity of the tool. Each sidewall 101, 102, 103, 104 may be connected to the floor 110 such that the orientation of the sidewall 101, 102, 103, 104 is within 10° of vertical (i.e perpendicular) to the common horizontal plane defined by the termination of the support ribs 120.

Additionally, in a preferred embodiment, the orientation of the support ribs 120 should not impede the direction of flow of the polymeric material during injection molding. For example, the support ribs 120 may run parallel to, perpendicular to, or at an acute angle to, the direction of flow of material. The important consideration is that the ribs are constructed in such a manner that the material flows relatively evenly through the tool, does not back up during the injection molding process, and does not create voids in the finished product. In alternative embodiments, the support ribs 120 may be arranged in a variety of configurations, such as a sunburst pattern 124 (see FIG. 7), a diamond pattern 125 (see FIG. 8), and a honeycomb pattern (see FIG. 9).

Figure 11:
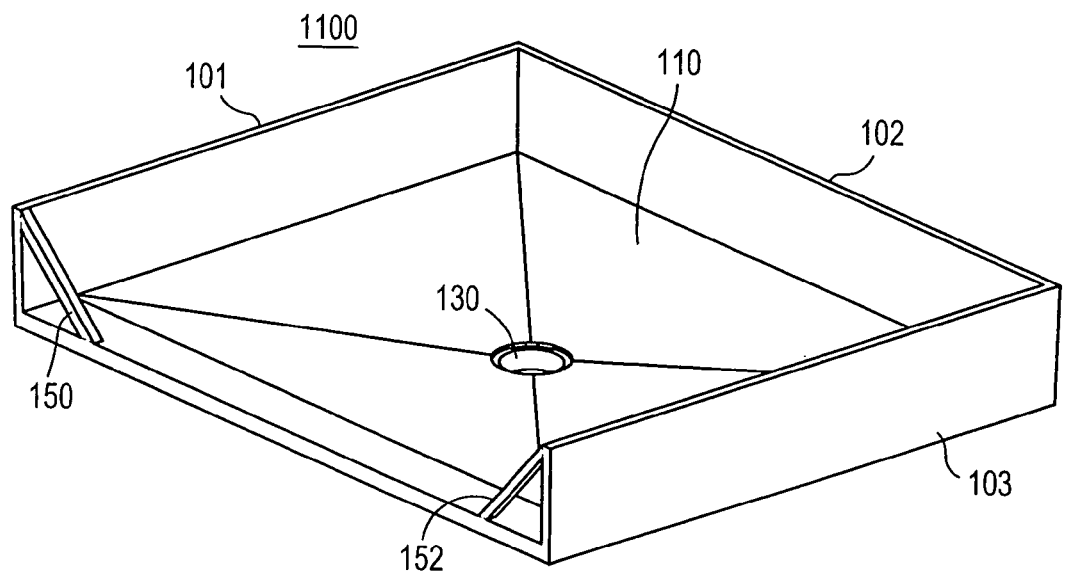
FIG. 11 is a front/top perspective view of a handicapped-accessible prefabricated shower module in accordance with an alternative embodiment of the present invention.
Figure 12:
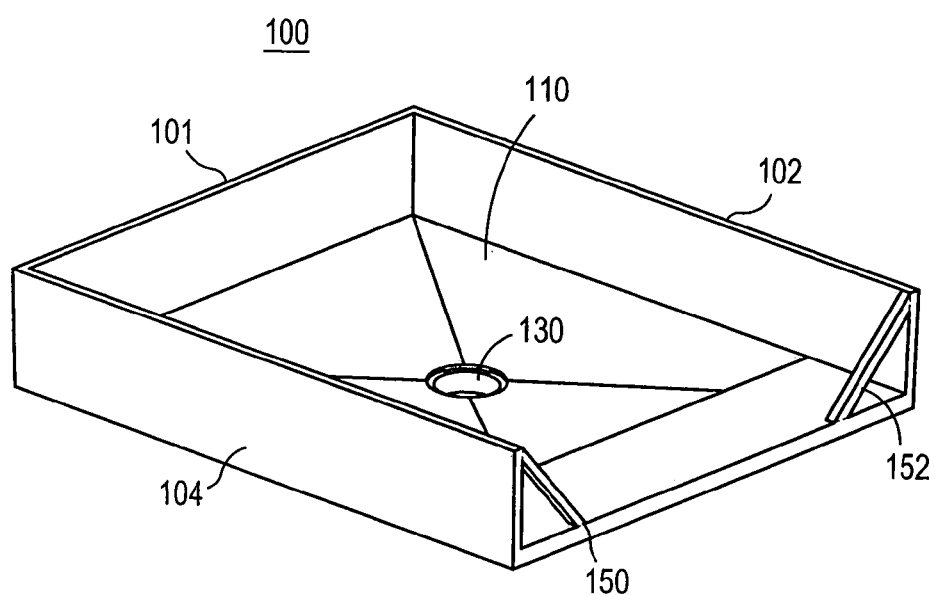
FIG. 12 is a front/top perspective view of a handicapped-accessible prefabricated shower module in accordance with another alternative embodiment of the present invention.
Figure 13:
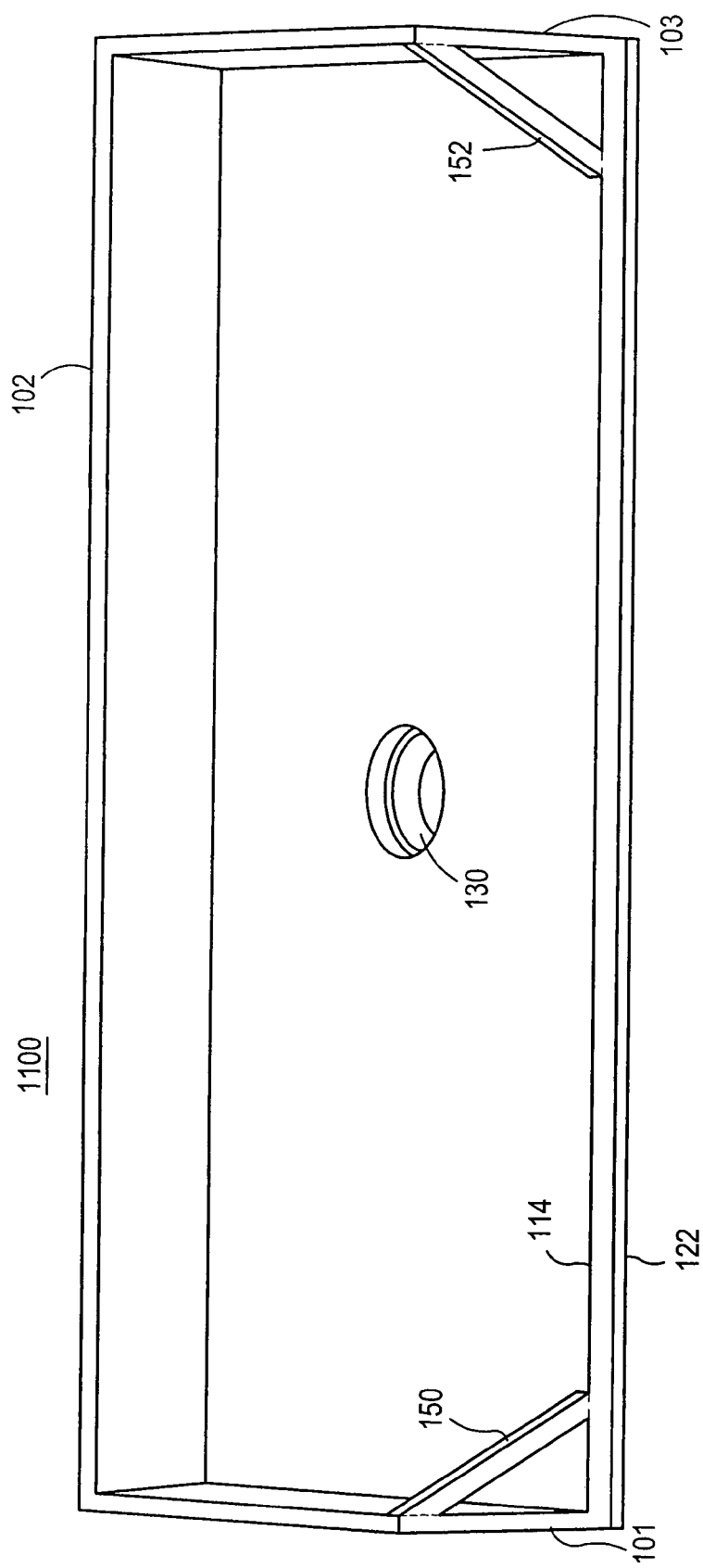
FIG. 13 is a front elevational view of the prefabricated shower module of FIG. 11.

In an alternative embodiment, as shown in FIGS. 11-13, at least one peripheral edge of the floor 110 is not connected to a sidewall. The absence of at least one wall allows the shower module 1100, 1200 to provide access to physically impaired persons and meets requirements established by the Americans with Disabilities Act (ADA), 42 U.S.C. §§12101-12213 (2000). Any sidewall 104 or combination of sidewalls 101, 102, 103, 104 may be partially or completely omitted by placing at least one insert into the cavity of the tool prior to injecting the polymeric material, at a location corresponding to a sidewall 104 of the ADA shower module 1100, 1200. The insert fills all or a portion of the entire void in the tool intended to form the corresponding sidewall 104, thereby preventing polymeric material from flowing into the void and forming the sidewall 104. In this manner, the manufacturer may create a variety of shower modules 100, 1100, 1200 from the same tool, with the only difference being which portion of an entire sidewall 101, 102, 103, 104 is not included (e.g., a sidewall 103 along a longer side of the shower module 1100, a sidewall 104 along a shorter side of the shower module 1200, two sidewalls 102, 104 on opposite edges of the floor 110 to create a "pass-through" shower module (not shown), or two adjacent sidewalls 101, 102 to create a corner shower module (not shown)). The floor 110 of the ADA shower module 1100, 1200 at the entrance to the shower, after having tile installed on the upper surface 112, is virtually flush with the floor of the bathroom in which the shower module 110, 1200 is installed, or slightly raised. Further, the shower module 1100, 1200 is pitched from the peripheral edges of the floor 110 to the drain aperture 130. In this manner, a wheelchair or other mobility-assisting apparatus (e.g., a walker, crutches, a cane, etc.) may freely enter and exit the shower enclosure.

Because the ADA shower modules 1100 have all or a portion of at least one sidewall completely removed, the edges of the sidewalls 101, 103 adjacent to the removed sidewall are unsupported, which creates potential problems when transporting the shower module 1100 prior to installation. In addition, shower modules 1400, 1500 (See FIGS. 14-15) with and integrated curb 140 which is lower than one or more adjacent sidewalls 101, 102, 103, 104 likewise have portions of sidewalls that are not fully supported by adjacent sidewalls. These unsupported or not fully supported sidewall edges may break if the shower module 1100, 1200, 1400, 1500 is accidentally dropped or mishandled. To provide temporary support, removable support bars 150, 152 are connected between the upper edge of each sidewall 101, 103 and the peripheral edge of the floor 110 along the side missing a sidewall (or between the upper edge of each sidewall and the curb 140 for those modules 1400, 1500 having an integrated curb 140 with a lower height than an adjacent sidewall). These support bars 150, 152 may be diagonal beams, or solid shapes (e.g., triangular, rectangular, etc.) created during the molding process, or added after the shower module 1110 has been formed. In the event that the support bars 150, 152 are created during the molding process, they may include fatigue lines along the intersection created between the support bar 150, 152 and the sidewall 101, 103, and the intersection between the support bar 150, 152 and the floor 110. Alternatively, the fatigue lines may be created by the manufacturer by scoring the support bars 150, 152 along the above described intersections. Implementation of the fatigue lines allow an installer to easily and conveniently break the support bars 150, 152 away from the shower module 1100 after the shower module has been set in place in the area intended for a shower enclosure. Thus, the possibility that the edges of the sidewalls 101, 103 become damaged prior to installation is greatly reduced. Alternatively, the installer may simply cut the support bars 150, 152 away from the shower module 1100 after installation.

In a similar manner as described above, the height of a sidewall 104 or combination of sidewalls 101, 102, 103, 104 may be lowered to a height suitable for installing a modular curb 300 adjacent to the shower module 100. At least one insert that runs the entire the length of a sidewall 101, 102, 103, 104, or any portion thereof, is placed inside the cavity of the tool prior to injecting the polymeric material, at a location corresponding to a sidewall 104 of the ADA shower module 1100, 1200. The height of the insert corresponds to the difference in height between a full sidewall 101, 102, 103 and the lowered sidewall 104. The insert partially fills the void in the tool intended to form the corresponding sidewall 104, thereby preventing polymeric material from flowing into the void and forming a sidewall 104 having a lowered height. Inserts may be placed within the tool at locations corresponding to any sidewall or combination of sidewalls, thus allowing the manufacturer to create a variety of shower modules with a single tool.

Figure 14:
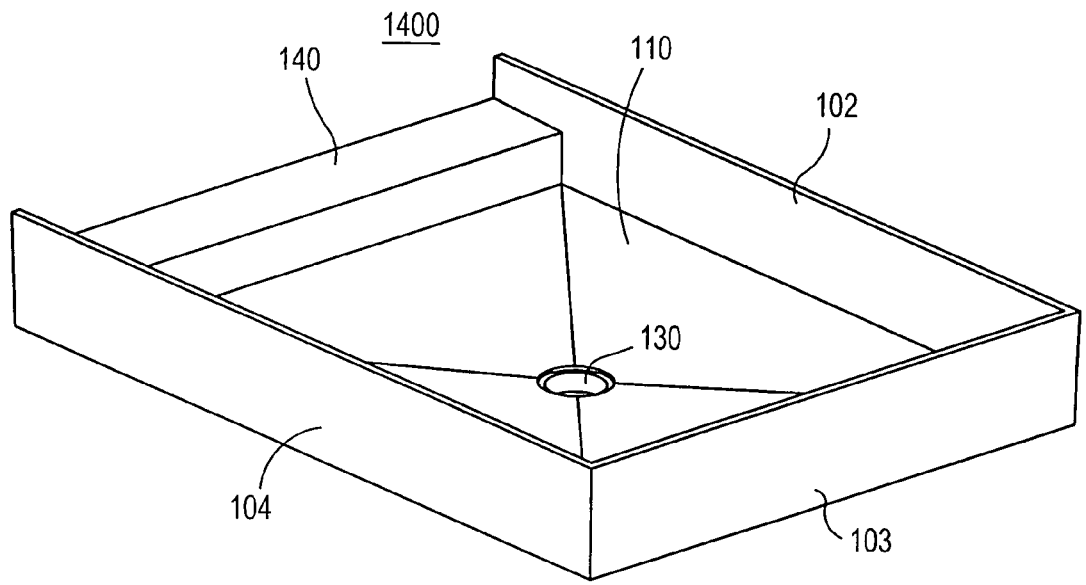
FIG. 14 is a front/top perspective view of a prefabricated shower module having an integrated curb, in accordance with another alternative embodiment of the present invention.
Figure 15:
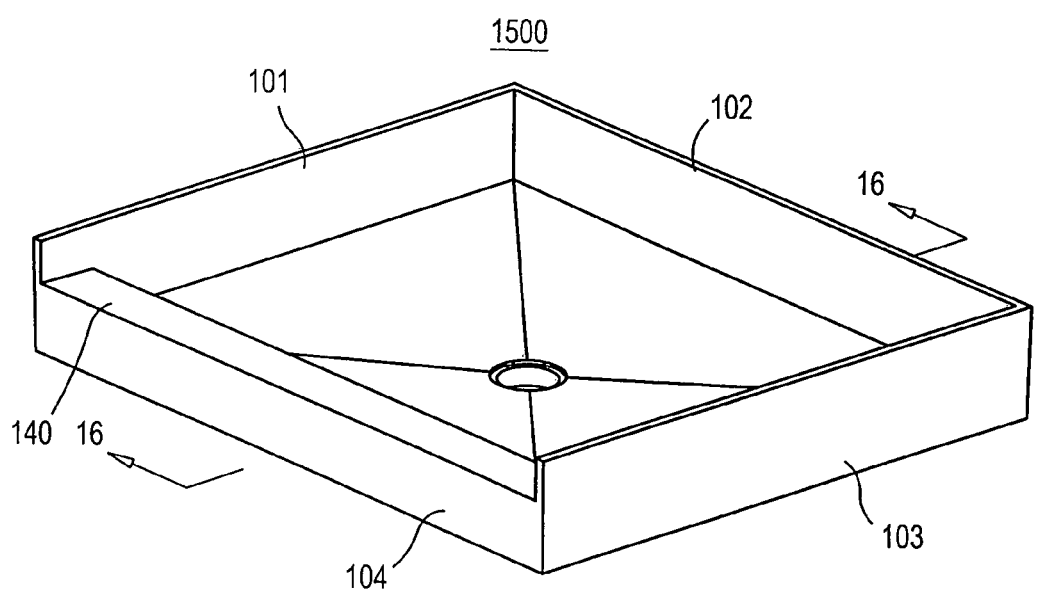
FIG. 15 is a front/top perspective view of a prefabricated shower module having an integrated curb, in accordance with another alternative embodiment of the present invention.
Figure 16:
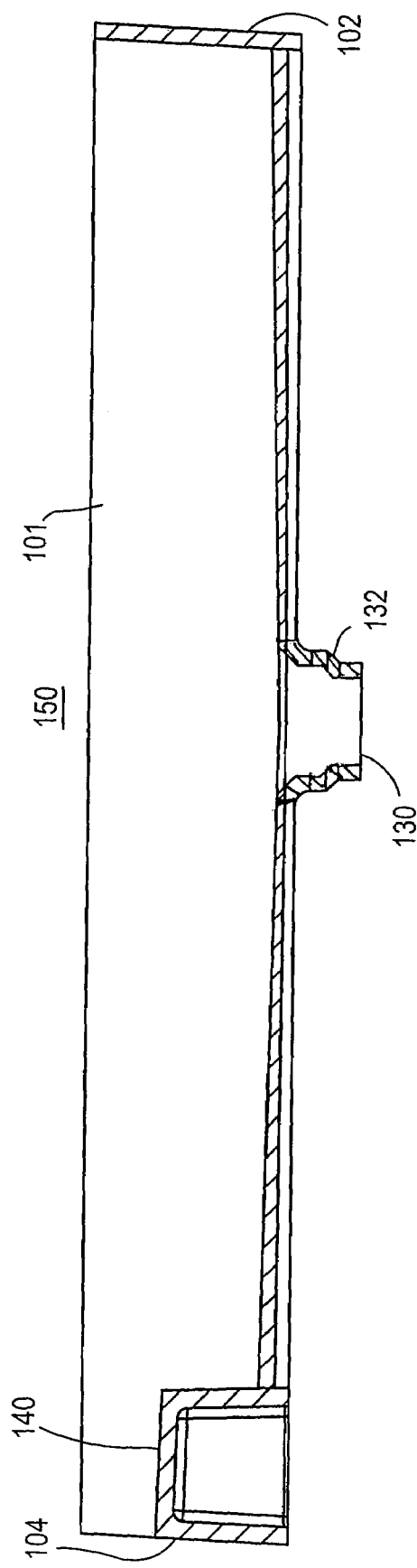
FIG. 16 is a cross-sectional view of the prefabricated shower module of FIG. 15 along the line 16-16.

In another alternative embodiment, as depicted in FIGS. 14-16, at least one side wall 104 may include an integrated curb 140 that is molded into the shower module 1500 during fabrication. Similar to the methods described above, the tool may contain voids in the cavity and core, proximate to the location of any sidewall, corresponding to the shape of the integrated curb 140. The manufacturer merely has to place inserts into the tool at the location of the unwanted curb to prevent the integrated curb from forming.

The use of inserts within the tool allows the manufacturer the flexibility of creating a wide variety of shower modules from a single tool. Each tool is an expensive investment. Additional charges are incurred every time a tool is changed out on the manufacturing line. The time required to change the tool is basically wasted time as the line is shutdown in anticipation of the new tool. Placing inserts into the tool, which are comparatively much less expensive than designing and purchasing individual tools for each permutation of sidewall, also allows for a much shorter downtime during the changeover as less time is required to fit or remove an insert than to completely remove and replace the whole tool. Thus, any combination of placement of sidewalls, height of sidewalls, integrated curbs, length of the shower module, and width of the shower module, may be accomplished using a single tool.

The shower module 100 may also be constructed to assist in preventing the spread of fire between floors of a multi-leveled building. In one embodiment, the drain wall 132 and an area on the lower surface 114 of the floor 110 within a given radius (e.g., 8 inches) of the drain wall 132 is coated with a fire retardant material. Thus, in the event that a fire were to ignite in a building one level below the bathroom where the shower enclosure is installed, the fire is hampered from spreading through the opening in the floor containing the drain pipe and engulfing the shower module 100. Alternatively, the shower module 100 may be molded from a fire-retardant polyurethane foam. In addition, the area around the drain wall 132 that sits in the plumbing hole in the subfloor can be filled with a fire-retardant material after installation of the shower module 100

Tile should be retained on the sidewalls 101, 102, 103, 104 and the upper surface 112 of the floor 110 using a resin based epoxy. The epoxy may contain 100% resin solids or resin solids mixed with a solvent, provided the epoxy contains 60% or more resin solids.

2. Method of Manufacturing

Figure 17:
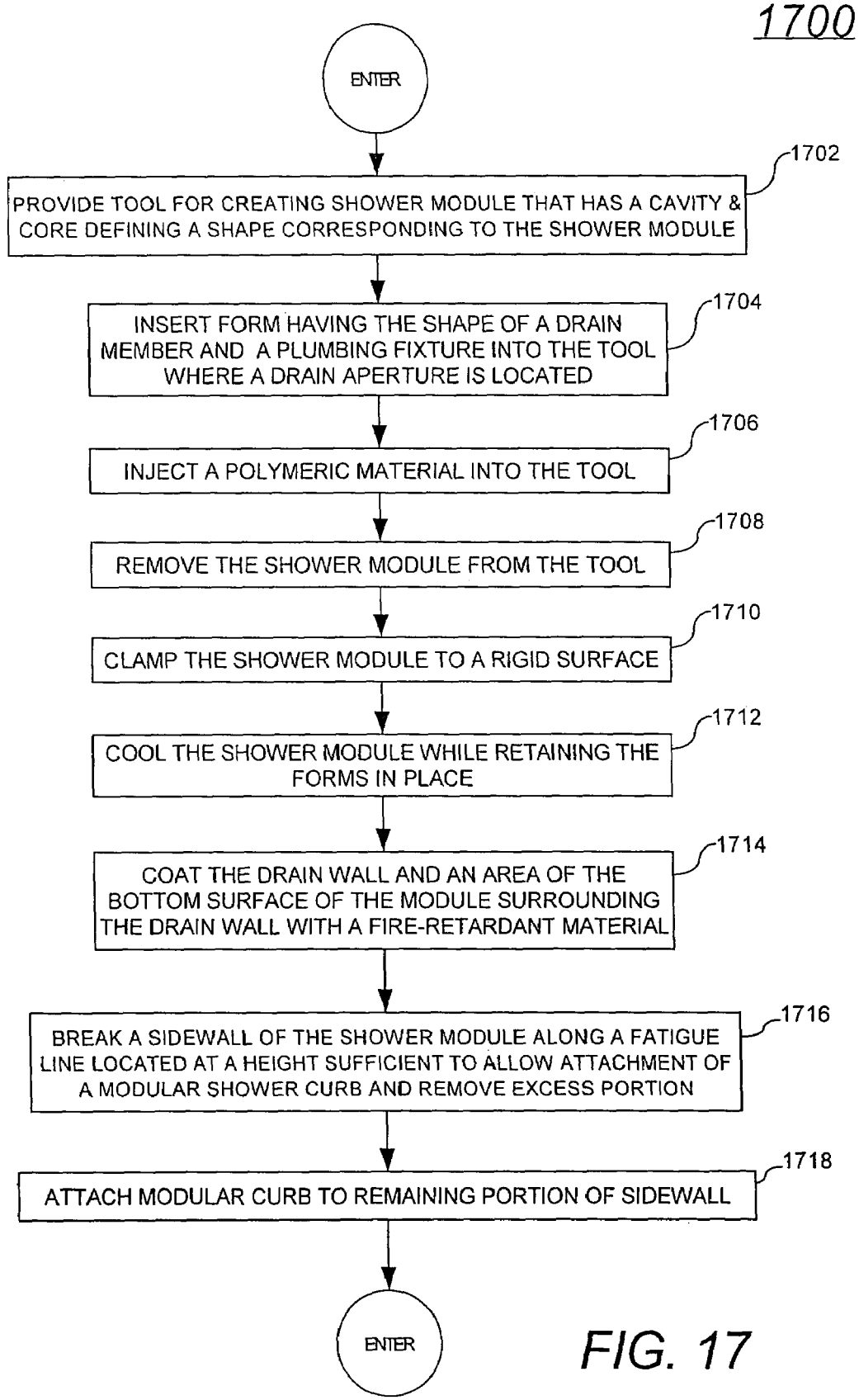
FIGS. 17-18 are logic flow diagrams of various steps executed to implement a method for manufacturing an improved, prefabricated leak-proof shower module, in accordance with exemplary embodiments of the present invention.

FIG. 17 illustrates an exemplary logic flow diagram 1700 executed by a manufacturer to implement a method for creating improved prefabricated shower modules suitable for use in constructing a tiled shower as described above. The manufacturer provides (1702) a tool for creating the leak-proof shower module 100. The tool includes a cavity and a core which define a shape corresponding to a shape of the leak-proof shower module 100. The shower module 100 may contain any, all, or a combination of the features detailed, supra, in Section 1. For example, the manufacturer may provide indentations in the tool that result in the formation of the support ribs 120 or the pitching ribs. The manufacturer may also place one or more inserts into a voided area of the tool (i) that corresponds to a sidewall 101, 102, 103, 104 of the shower module 100, thereby preventing the polymeric material from filling the voided area during injection molding, or (ii) corresponds to a portion of the length or width of the shower module thereby preventing the polymeric material from filling the voided area during injection molding. In addition, the manufacturer may mold a horizontal fatigue line 108 into one or more sidewalls 101, 102, 103, 104 by creating a raised tab along the length a voided area that corresponds to the sidewall 101, 102, 103, 104 at a height suitable for removing a portion of the sidewall 101, 102, 103, 104 and attaching a modular curb 300.

Next, the manufacturer inserts (1704) one or more forms into the tool between the cavity and the core at the location established for the drain aperture 130 for the purpose of forming the drain aperture 130 in the floor 110 and the drain wall 132 of the shower module 100. The drain aperture 130 may have a uniform diameter or the drain aperture 130 may have one or more diameters along the bottom portion of the drain aperture 130 for inserting all or a portion of a drain fixture 135 for connecting to the plumbing line, and a wider diameter at the top portion of the drain aperture 130 for inserting all or a portion of a plumbing fixture to accommodate a drain fixture top having a wider or variable diameter. Thus, the form may have a uniform diameter, or may contain a first portion corresponding to a drain fixture shape suitable for connecting to a plumbing line and a second portion corresponding to a drain fixture shape suitable for accommodating a the drain top of drain fixture 135. Alternatively, two forms may be used, wherein one form corresponds to a shape suitable for connecting to a plumbing line and the second form corresponds to a shape suitable for connecting to a plumbing line. A drain aperture reinforcing structure 136 may also be placed in the drain wall 132 and the floor 110 surrounding the drain aperture 130 to strengthen the area around the drain aperture 130.

Next, the manufacturer injects (1706) a polymeric material into the tool to produce the leak-proof shower module 100. The polymeric material should be injected into the tool such that the material flows in a direction unimpeded by any support rib 120. Thus, the polymeric material should flow in a direction parallel, perpendicular, or at an angle of 90° or less to any support rib 120 of the plurality of support ribs 120 or to any pitching ribs 121 of the plurality of pitching ribs 121.

The shower module 100 is cooled in the tool and as it cools, the polyurethane hardens and cures. Before it is completely cooled and cured, it may be removed (1708) from the tool and clamped (1710) to a rigid surface (e.g., a table, a workbench, etc.) while the shower module continues to cool (1712) and cure. Thus, the possibility of warping or bowing of the lower surface 114 or the upper surface 112 of the floor 110 of the shower module 100 is minimized. Additionally, the shower module 100 may actually spend less overall time in the tool before being removed as the steps taken during post-molding decrease the effects of any warping or bowing, thus allowing the shower module 100 to be removed faster than what would typically be acceptable. Thus, the manufacturing cycle-time per unit is reduced, which may reduce the total cost of the product.

After the shower module 100 has cooled to a solid condition (before or after removing the clamps) the manufacturer may coat (1714) the drain wall 132 and an area on the bottom surface 114 of the floor 110 surrounding the drain wall 132 with a fire-retardant material.

Additionally, the shower module 100 may be modified to allow a modular curb 300 to be attached to a sidewall 101, 102, 103, 104 of the shower module 100. The modification may be made by breaking (1716) the selected sidewall 101, 102, 103, 104 along a horizontal fatigue line at a height sufficient to allow attachment of a modular curb 300 thereto, and removing the excess portion. Alternatively, the sidewall 101, 102, 103, 104 may be cut to the appropriate height. Finally, the modular curb 300 is attached (1718) to the remaining portion of the sidewall 101, 102, 103, 104 by either the manufacturer (e.g., prior to shipment) or the installer (e.g., in the field).

After fabrication of the shower module 100 having a drain aperture 130 made for a drain fixture 135, the drain fixture 135 is inserted into the drain aperture 130 and a water-tight seal is formed at one or more of (i) the upper surface 112 of the floor 110 at or around the drain aperture 130, (ii) the drain aperture 130, and (iii) the lower surface 114 of the floor 110 at or around the drain aperture 130.

Figure 18:
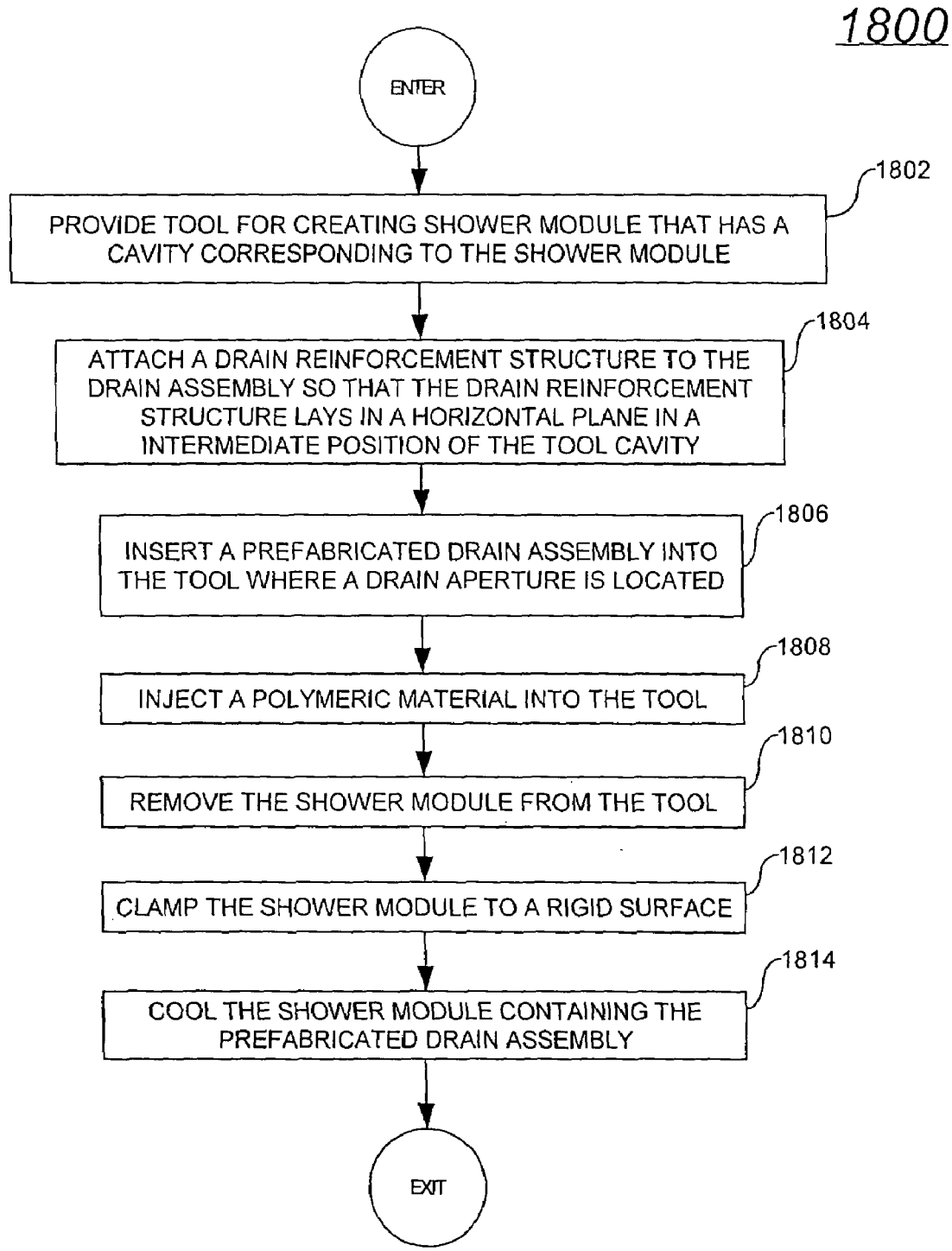

In an alternative embodiment, as illustrated in FIG. 18 by the exemplary logic flow diagram 1800, a prefabricated drain assembly 134 may be embedded within the floor 110 and drain wall 132 of the shower module 100 during injection molding. Similar to the above process, the manufacturer begins by providing (1802) a tool for creating the shower module 100. The tool includes a cavity portion and a core portion which define a shape corresponding to a shape of the shower module 100. As above, the shower module 100 may contain any, all, or a combination of the features detailed, supra, in Section 1.

Next, the manufacturer attaches (1804) a drain reinforcing structure 136, which contains an opening in the center, to a prefabricated drain assembly 134 in such a manner that the edges of the interior diameter of the drain reinforcing structure 136 interfere with the outer diameter of the prefabricated drain assembly 134. The drain assembly 134 with the attached drain reinforcing structure 136 is then inserted (1806) inside the tool at a location corresponding to the location of the drain aperture 134 such that the drain reinforcing structure 136 lies in a horizontal plane in an intermediary position between the cavity and the core of the tool. Next, the manufacturer injects (1808) a polymeric material into the tool, thereby embedding the drain reinforcement structure 136 in the shower module 100 and integrating the drain assembly 134 within the floor 110 of the shower module 100. As above, the polymeric material should be injected into the tool such that the material flows in a direction unimpeded by any support rib 120. The manufacturer removes (1810) the integrated shower module 100 from the tool, clamps (1812) the shower module 100 to a table (or other rigid surface) to prevent movement, and allows the integrated shower module to cool (1814) while still clamped to the table.

3. The Prefabricated Modular Curb

Figure 19:
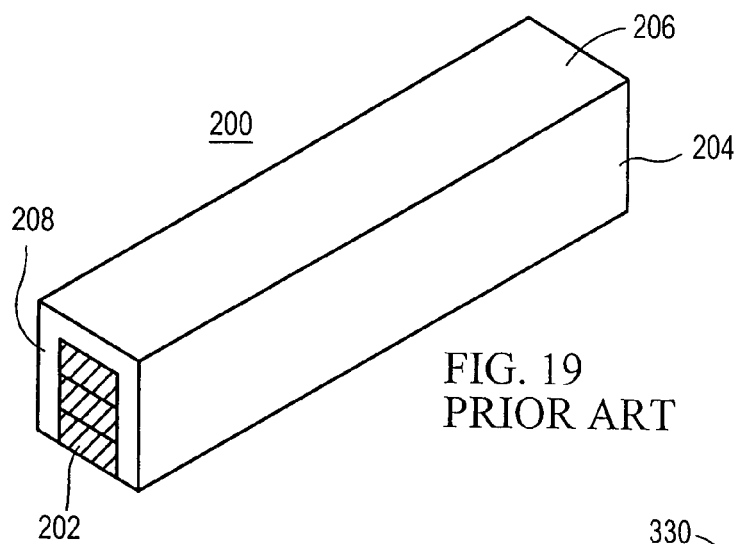
FIG. 19 is a front/top perspective view of a prior art modular curb.
Figure 20:
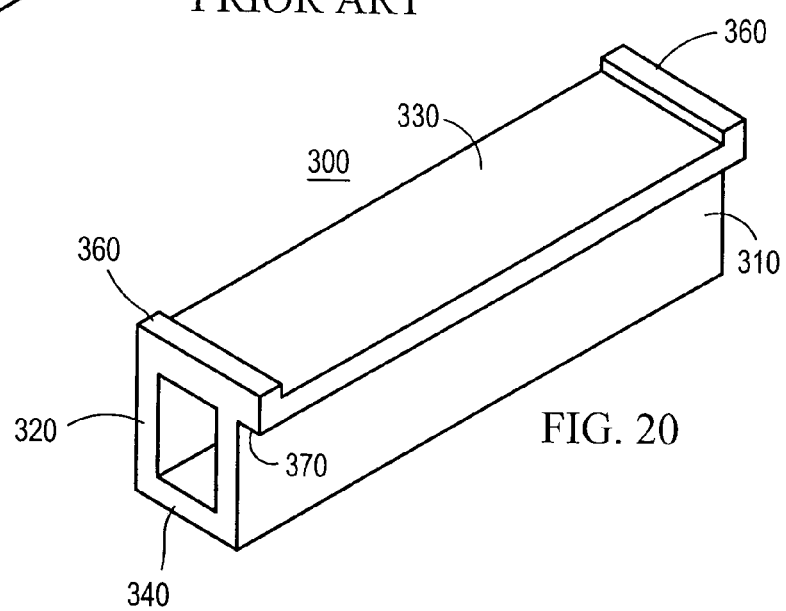
FIG. 20 is a front/top perspective view of a prefabricated modular curb in accordance with one embodiment of the present invention.
Figure 21:
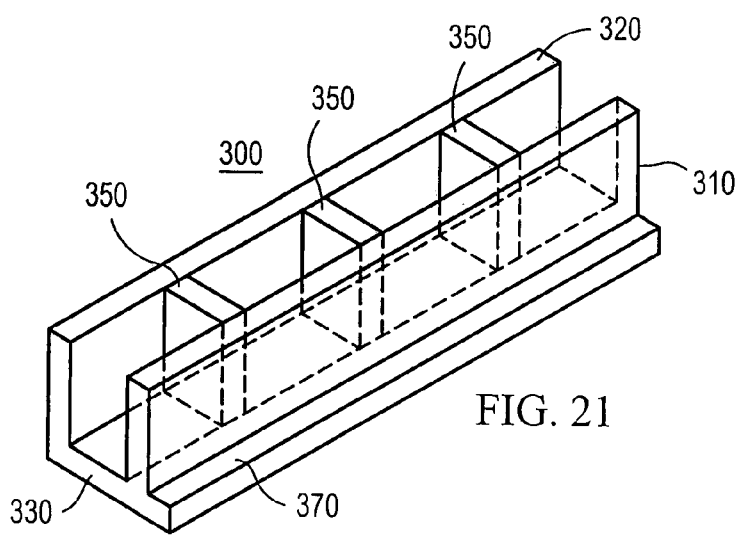
FIG. 21 is a front/bottom perspective view of a prefabricated modular curb in accordance with one embodiment of the present invention.

Generally, when constructing a tiled shower enclosure, installers build a curb at the intersection of the shower enclosure and the bathroom floor that serves as a dam to prevent water from escaping onto the floor. Typically, the curb was simply constructed by vertically stacking two or three wooden 2×4" boards, covering the boards with a leak-proof liner, and applying tile on top of the liner. At least one prefabricated curb 200, as illustrated in FIG. 19, has previously been offered for use in construction of shower enclosures. The prior art curb 200 simply consists of a U-shaped form having a top wall 206, a front wall 204, and a rear wall 208. The distance between the front wall 204 and the rear wall 208 is approximately the width of a standard 2×4 202. The prior art curb 200 is typically designed to receive structural support from 2×4's 202 stacked in the same manner as when a curb is constructed manually.

An embodiment of the present invention, as shown in FIGS. 20-23, includes an improved prefabricated modular curb 300 suitable for use in constructing a tiled shower, in conjunction with a prefabricated shower module 100, and method of installation. The modular curb 300 includes an exterior wall 320, a top wall 330, and a mounting wall 310 that engages a sidewall 101, 102, 103, 104 of a shower module 100 when installed proximate to the shower module 100. The top wall 330 extends perpendicularly from the upper edge of the exterior wall 320 to the upper edge of the mounting wall 310. Alternatively, the exterior wall 320 may be taller than the mounting wall 310 such that the top wall 330 is pitched to slope downwards toward the sidewall 101, 102, 103, 104 of the shower module 100 when the modular curb 300 is installed adjacent to the sidewall 300. The outer surface of the exterior wall 320 and the outer surface of the top wall 330 are suitable for retaining tile, stone, and/or marble using an epoxy containing 100% resin solids or resin solids mixed with a solvent.

The modular curb 300 may also, but not necessarily, include a bottom wall 340 that extends from the bottom edge of the exterior wall 320 to the bottom edge of the mounting wall 310, and opposite to the top wall 330. At least one reinforcing curb rib 350 is attached to at least one of to the top wall 330, the inner surface of the mounting wall 310, the inner surface of the exterior wall 320, the bottom wall 340 (if present), or any combination thereof. The reinforcing curb rib 350 runs perpendicular to, parallel to or at an acute angle to the mounting wall 310 or the exterior wall 320.

The combination of the modular curb 300 with the shower module 100 offers significant improvements over the prior art module 100 by combining a leak-proof shower module with an attached leak-proof mounting wall, thereby maintaining the leak-proof quality of the overall shower base system. In addition, the modular curb 300 may be manufactured from a single tool using a combination of inserts. Each insert corresponds to the cross-sectional shape of the modular curb 300, but has varying lengths. By placing or removing one or more inserts, the length of the prefabricated modular curb 300 may be customized through the manufacturing process. Alternatively, the modular curb 300 may simply be cut to the desired length after fabrication.

In one embodiment, the top wall 330 may include a horizontal lip 360 on the upper surface along the length of one or both ends. The horizontal lip 360 should be at least 1 inch tall and at least ⅜ inches wide so that a standard-sized wallboard may rest on the lip 360. Additionally, the curb 300 may include a reinforcing curb rib 350 at one or both ends, connected perpendicularly to the exterior wall 320 and to the mounting wall 310 and effectively enclosing the corresponding end.

Figure 22:
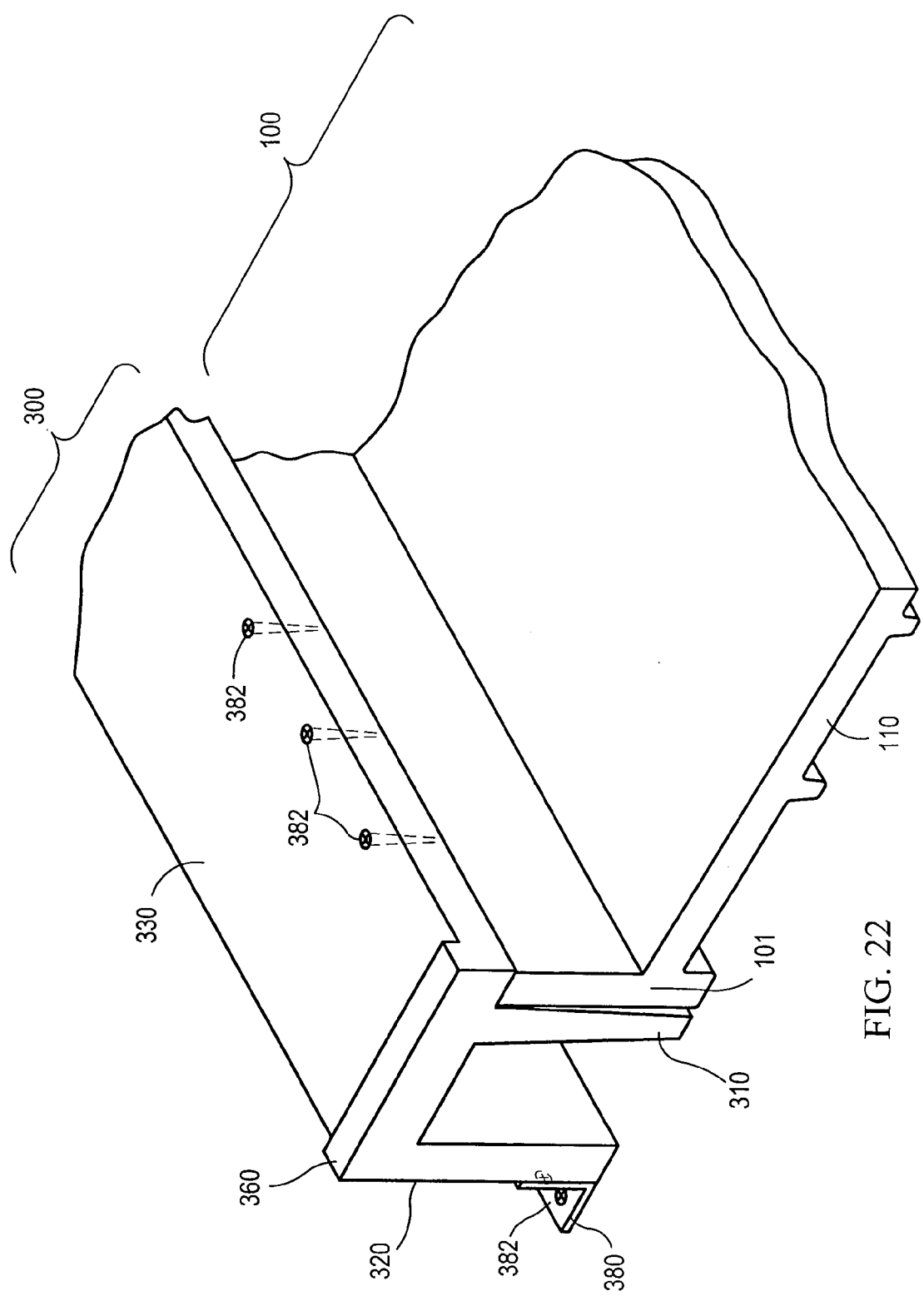
FIG. 22 is a side/top perspective view illustrating an exemplary installation of the modular curb of FIG. 21 with the shower module of FIG. 1.

In another embodiment, the top wall 330 extends beyond the outer surface of the mounting wall 310 to terminate in a ledge 370 having a width substantially equal to the width of the sidewall 101, 102, 103, 104 of the shower module 100 (see FIG. 22). Thus, when the modular curb 300 is installed adjacent to the shower module 100, the ledge 370 extends over the top of the sidewall 101, 102, 103, 104 and the outer edge of the ledge 370 is substantially flush with the inner surface of the sidewall 101, 102, 103, 104.

Figure 23:
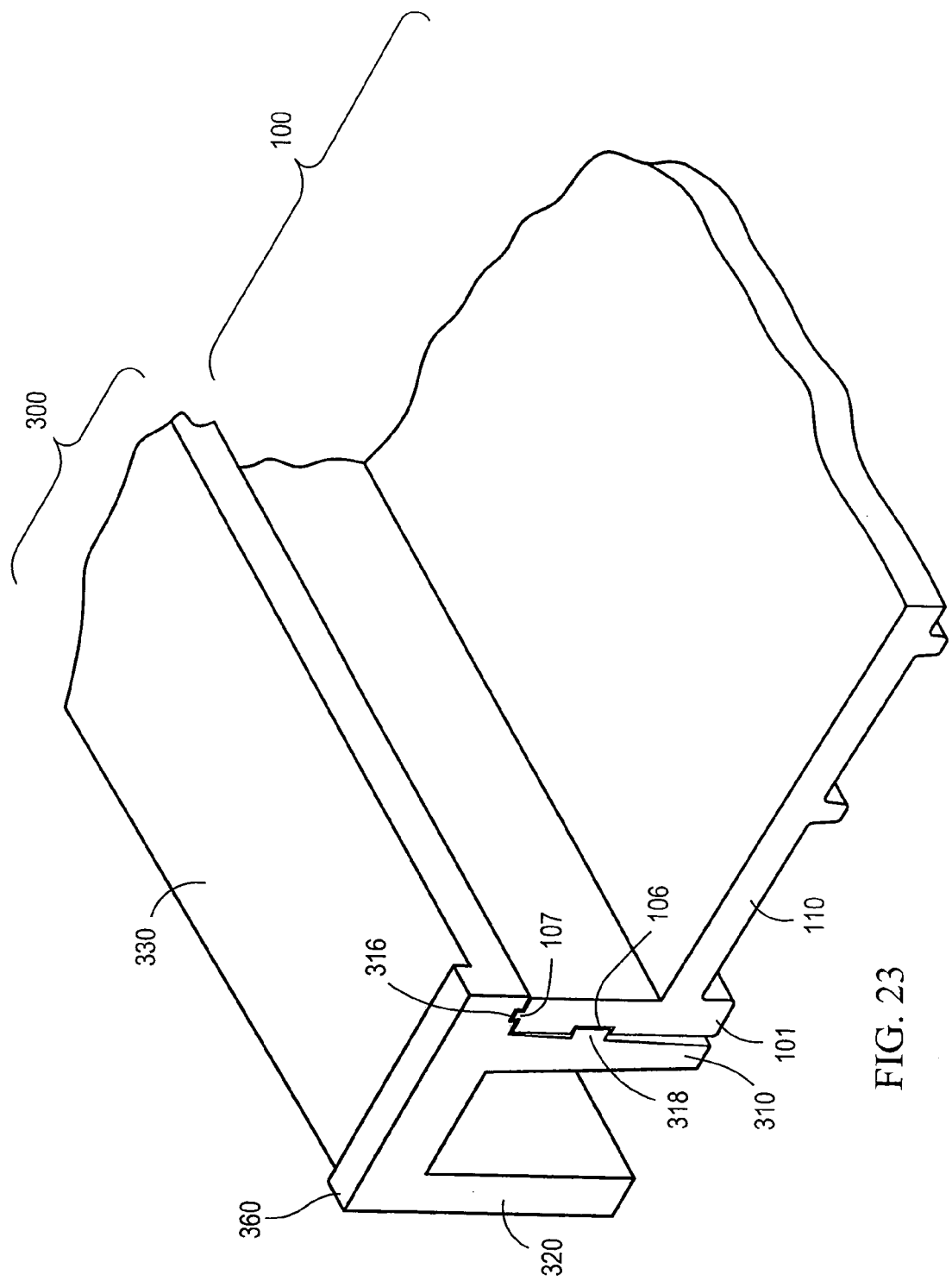
FIG. 23 is a side/top perspective view illustrating an exemplary installation of an alternative embodiment of a modular curb in accordance with an exemplary embodiment of the present invention.

In an alternative embodiment, as shown in FIG. 23, the modular curb 300 may also include an attachment mechanism 316, 318 located along the outer surface of the mounting wall 310 for engaging a corresponding attachment mechanism 106 in the sidewall 101, 102, 103, 104 of the shower module 100. The modular attachment mechanism 316, 318 may be a tab, a notch, a slot, a tongue, a groove, a ridge, a peg, an aperture, an interlocking clip, or any combination thereof.

In one embodiment, the modular curb 300 may be constructed using similar polyurethane reaction injection molding techniques as described above in relation to the prefabricated shower module 100. The process of molding the modular curb 300 faces some similar issues as when molding the shower module 100. For instance, the direction of flow of the polymeric material should be unimpeded by the reinforcing curb ribs 350 during injection molding in order for the material to flow properly. Thus, the reinforcing curb ribs 350 should run parallel to or at an angle of 90° or less to the direction of flow of polymeric material. Additionally, to provide the proper support, the modular curb 300 should be molded from a polyurethane foam (which may also be fire-retardant) having a density of 12 pounds per cubic foot or greater.

Figure 24:
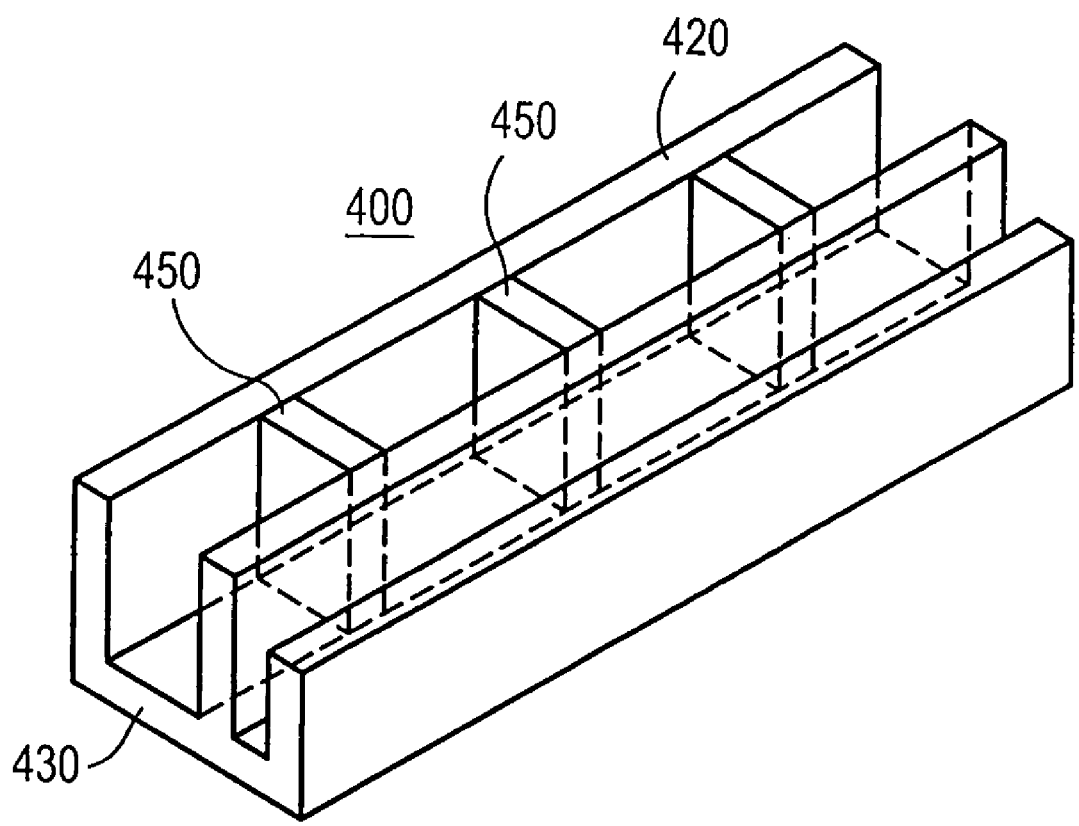
FIG. 24 is a front/bottom perspective view of a prefabricated modular curb in accordance with an alternative embodiment of the present invention.
Figure 24A:
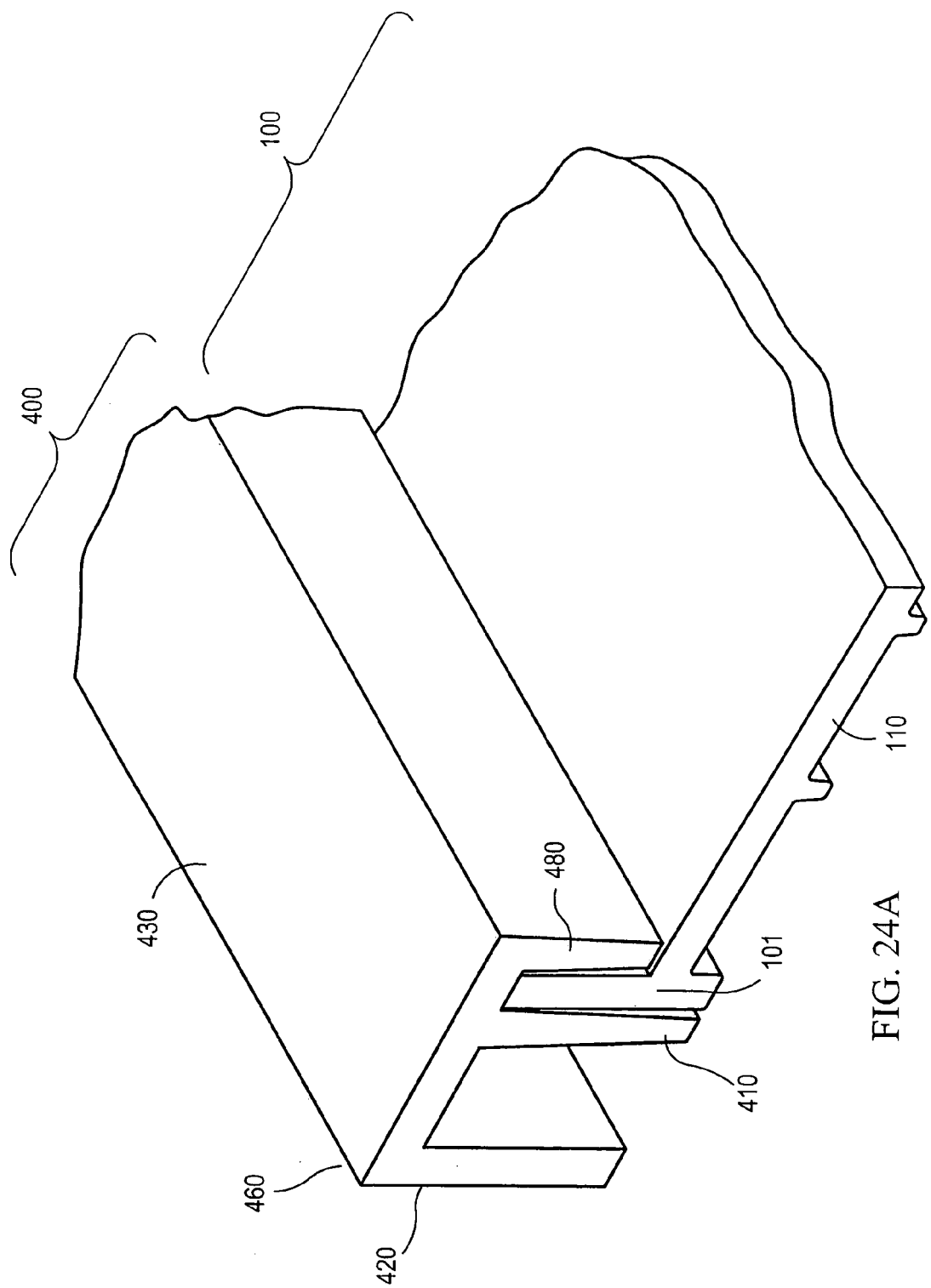
FIG. 24A is a side cross-sectional view illustrating an exemplary installation of an alternative embodiment of a modular curb in accordance with an exemplary embodiment of the present invention.

In another alternative embodiment, as shown in FIGS. 24-24A, a prefabricated modular curb 400 includes an outer mounting wall 410, an inner mounting wall 480, an exterior wall 420, and a top wall 430. The top wall 430 is attached substantially perpendicular to the upper edge of the exterior wall 420, to the upper edge of the inner mounting wall 480, and to the upper edge of the outer mounting wall 410. The outer mounting wall 410 is located at an intermediary point between the inner mounting wall 480 and the exterior wall 420. The distance from the outer mounting wall 410 to the inner mounting wall 480 is slightly greater than the width of a sidewall 101, 102, 103, 104 of the shower module 100, such that when the curb 100 is mounted adjacent to the shower module 100, the sidewall 101, 102, 103, 104 is retained between the outer mounting wall 410 and the inner mounting wall 480. The exterior wall 420 may be the same height or taller than the inner mounting wall 480 so that the top wall 430 is horizontal or slightly pitched towards the shower module 100 upon installation. The inner mounting wall 480 is shorter than the outer mounting wall 480 and should rest on in or near the floor 110 of the shower module 100 upon installation. Additionally, the modular curb 400 may include reinforcing curb ribs 450 attached to at least one of the top wall 430, the outer mounting wall 410, and the exterior wall 420.

Figure 25:
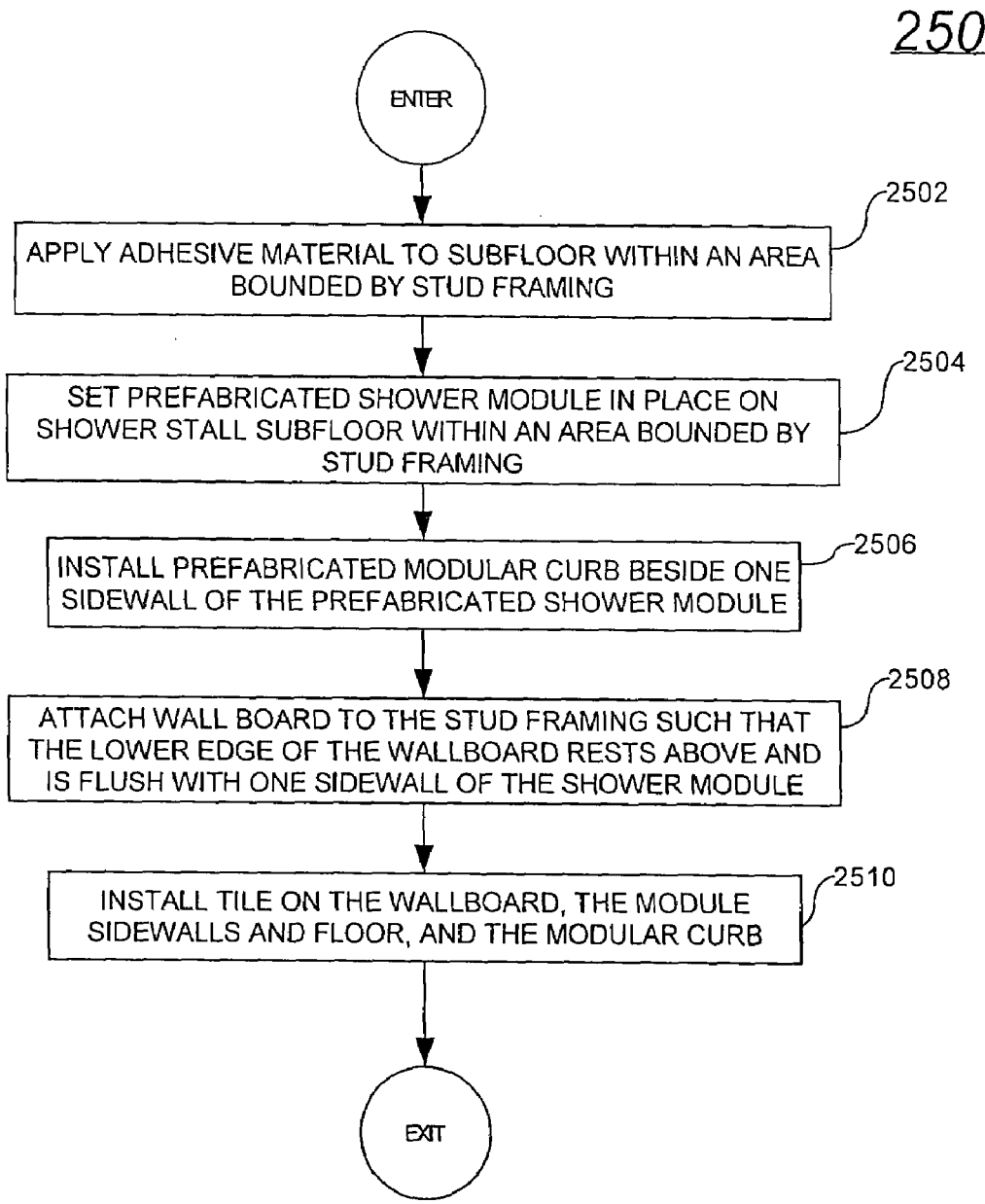
FIGS. 25-27 are logic flow diagrams of various steps executed to implement a method for creating a tiled shower stall using a prefabricated leak-proof shower module and a prefabricated modular curb, in accordance with exemplary embodiments of the present invention.
Figure 26:
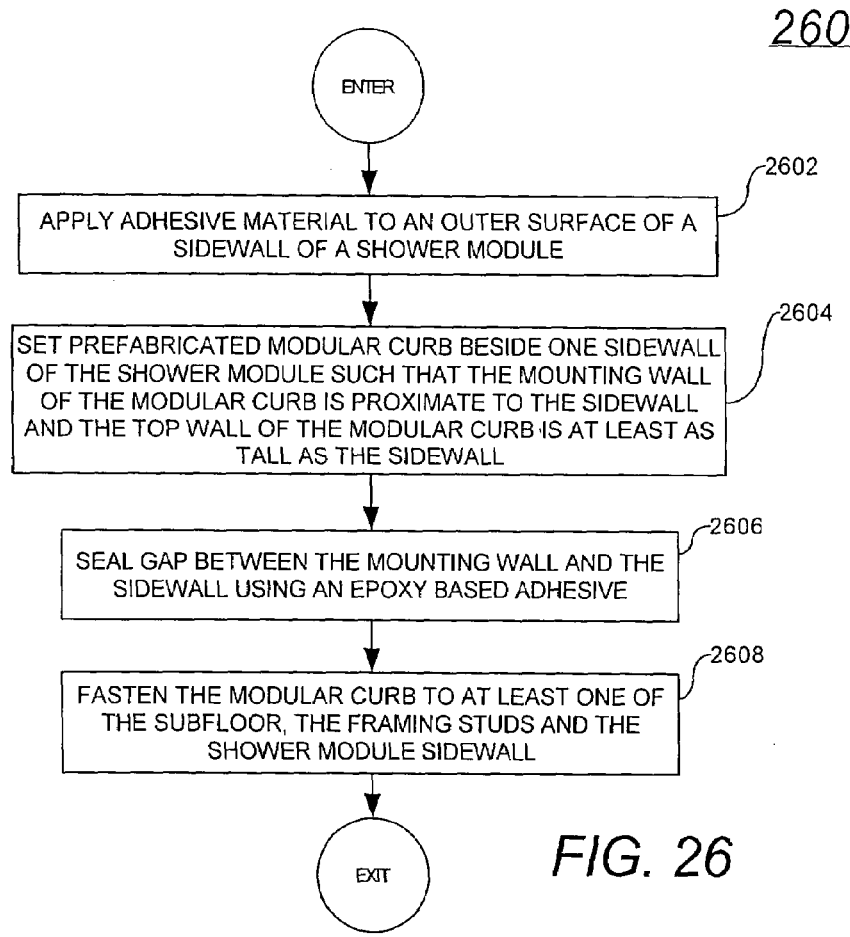
Figure 27:
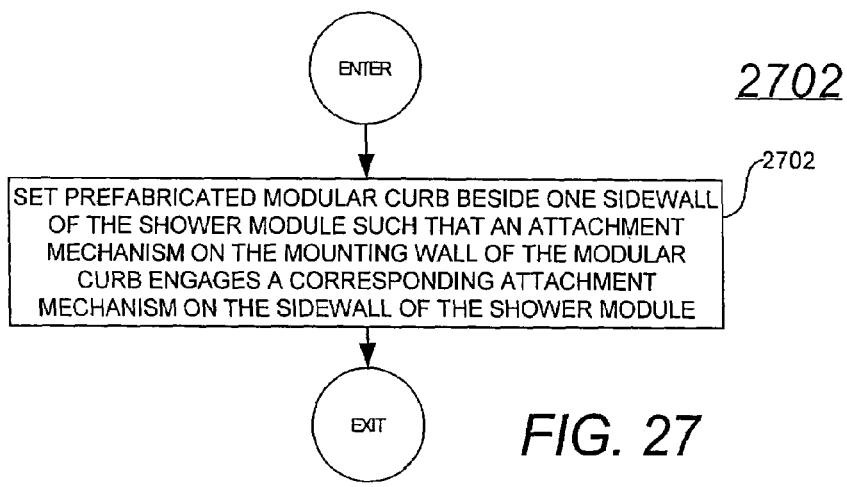

FIG. 25 illustrates an exemplary logic flow diagram 2500 executed by a shower enclosure installer to implement a method for constructing a tiled shower enclosure within an area bounded by a subfloor and stud framing using a prefabricated modular curb 300 and a prefabricated shower module 100. The subfloor includes a plumbing connection that leads to a sewer line or septic tank. The installer begins by applying (2502) a quantity of adhesive material on the subfloor within the area bounded by the stud framing. Next, the installer sets (2504) a prefabricated leak-proof shower module 100 in place on the subfloor within the area bounded by the stud framing. The shower module 100 should be positioned on the subfloor such that the support ribs 120 are in supporting engagement with the subfloor, at least one sidewall 101, 102, 103, 104 is substantially adjacent to the stud framing, and the drain assembly 134 is in fluid communication with the subfloor plumbing connection.

The installer then installs (2506) a prefabricated modular curb 300 adjacent to at least one sidewall that is not adjacent to the stud framing. Exemplary methods of installing the prefabricated modular curb 300 are detailed in the logic flow diagrams of FIGS. 26 and 27. Following the steps for implementing the method detailed by logic flow diagram 2600, the installer applies (2602) a quantity of adhesive material to the outer surface of the sidewall 101, 102, 103, 104 and sets (2604) the modular curb beside the sidewall 101, 102, 103, 104 such that the mounting wall 310 of the modular curb 300 is proximate to the sidewall 101, 102, 103, 104 and the top wall 330 is positioned at the same level or above the top edge of the sidewall 101, 102, 103, 104. Next, the installer seals (2606) any gap between the mounting wall 310 and the sidewall 101, 102, 103, 104 using an epoxy based adhesive to form a water-tight, leak-proof seal. Additionally, or alternatively, the installer may fasten (2608) the modular curb to the subfloor, the framing studs, or the sidewall 101, 102, 103, 104 using brackets 380 and screws 382 or any other traditional fasteners (e.g., screws, nails, rivets, etc.). In the finished tiled shower enclosure, the fasteners are completely hidden from view by the application of tile.

Alternatively, the installer may set (2702) the prefabricated modular curb 300 adjacent to the sidewall 101, 102, 103, 104 such that an attachment mechanism 106 (e.g., a tab, a notch, a slot, a tongue, a groove, a ridge, a peg, an aperture, an interlocking clip, etc.) along an outer surface of the sidewall 101, 102, 103, 104 engages with a corresponding attachment mechanism 316, 318 along the outer surface of the mounting wall 310 of the modular curb 300. The installer may also connect the modular curb 300 to the sidewall 101, 102, 103, 104 of the shower module 100 by inserting one or more screws 382 through the ledge 370, engaging the sidewall 101, 102, 103, 104, as shown in FIG. 22.

Referring back to FIG. 25, after installing the modular curb 300, the installer then attaches (2508) wallboard to the framing such that a lower edge of the wallboard rests above and is flush with any sidewall 101, 102, 103, 104 adjacent to the stud framing. Finally, the installer installs (2510) tile on the wallboard, the module sidewalls 101, 102, 103, 104, the floor 110, and the modular curb 300, thereby resulting in a tiled shower.

4. The Shower Bench and Ledge

Figure 28:
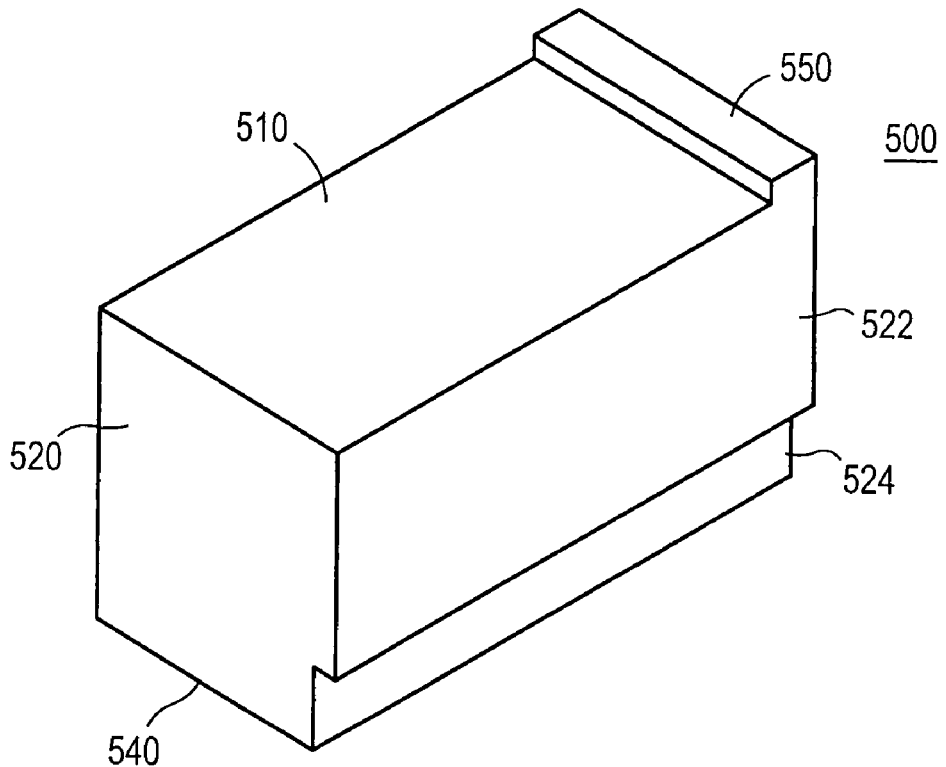
FIG. 28 is a front/top perspective view of a prefabricated shower seat in accordance with an embodiment of the present invention.
Figure 29:
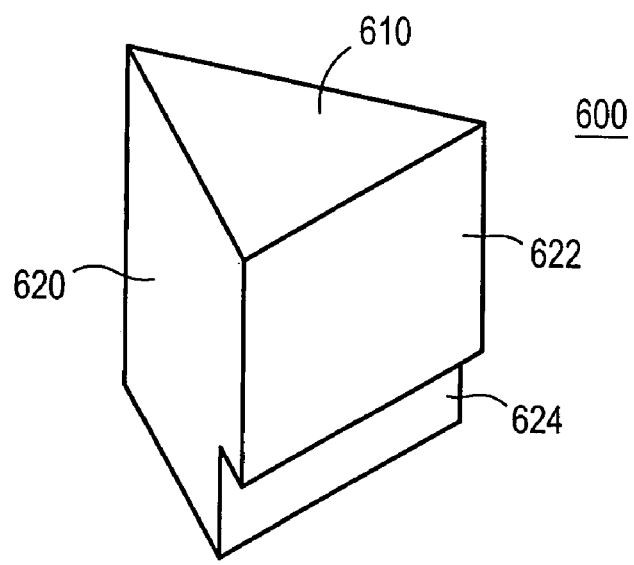
FIG. 29 is a front/top perspective view of a prefabricated shower seat in accordance with an alternative embodiment of the present invention.
Figure 30:
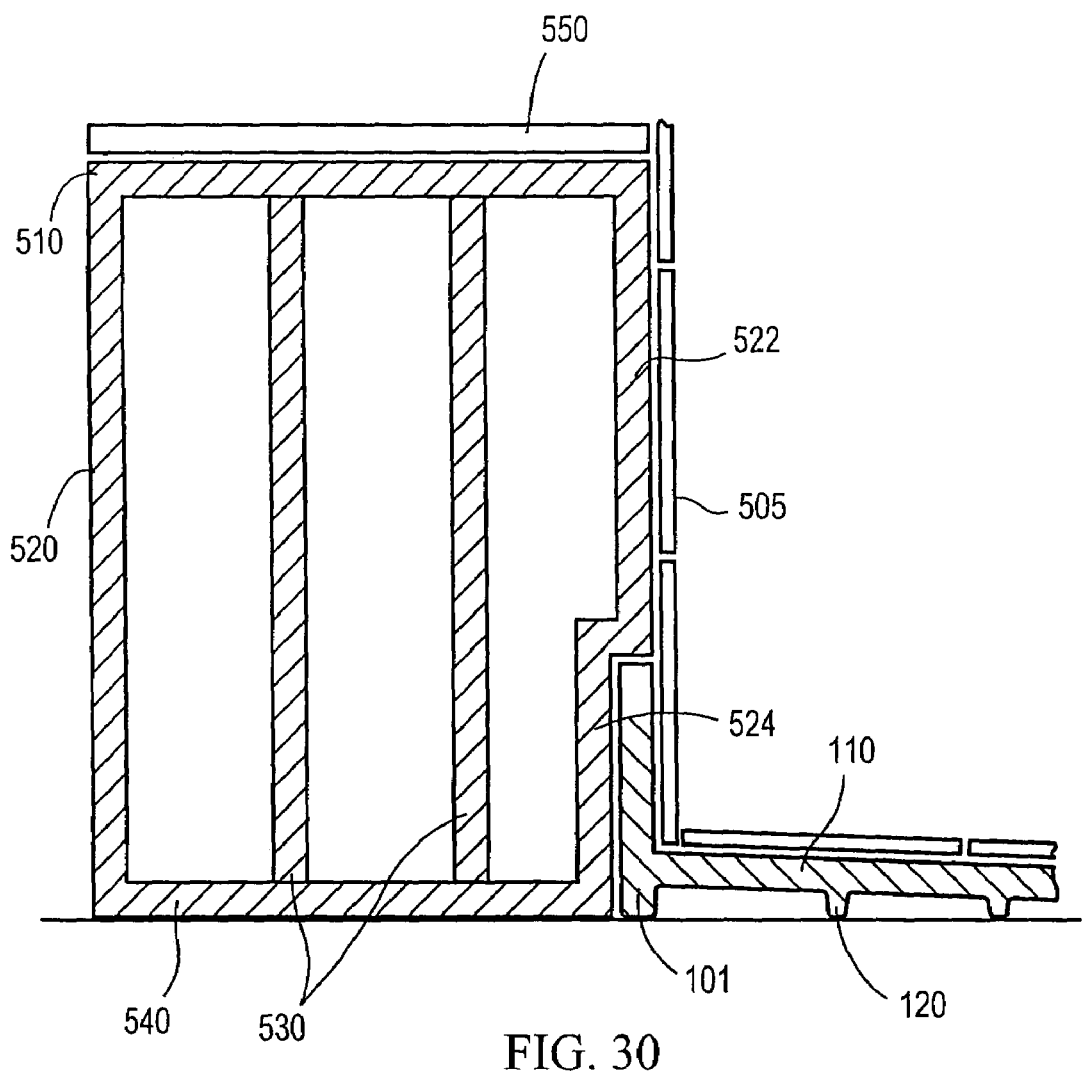
FIG. 30 is a side elevational view illustrating an exemplary installation of the prefabricated shower seat of FIG. 28 installed with a prefabricated shower module of FIG. 1, in accordance with an embodiment of the present invention.

The final component of the leak-proof modular shower enclosure system includes a shower bench or ledge, as illustrated in FIGS. 28-30. The combination of the bench and ledge with the shower module 100 offers significant improvement over prior art by attaching a leak-proof shower bench or ledge to a leak-proof shower module, at an attachment point that is also leak-proof, thereby maintaining the leak-proof integrity of the shower base system. In addition, the shower bench and shower ledge may each be made in their own tool using a combination of inserts, which permit the shower bench and the shower ledge to be made with a variable height, variable length, and variable depth so that the shower bench and the shower ledge can be customized either through the manufacturing process or after fabrication by cutting the shower bench and the shower ledge to the desired dimensions. The term "shower ledge" includes any structure, regardless of specific height, width, or length and having a substantially horizontal surface, for use in constructing a tiled shower enclosure. A "shower ledge" may or may not be intended to support the weight of a person or persons. Thus, the use of the term "shower bench," as used in the context of the following discussion is interchangeable with the term "shower ledge." Typically, a "shower bench" is simply a shorter version of a "shower ledge."

In one embodiment, the shower bench 500 is designed for installation between the shower module 100 and a stud-framed wall of the tiled shower enclosure. The shower bench 500 may include a rectangular seating surface 510, as shown in FIG. 28, connected to an upper edge of a sidewall 520 along each peripheral edge. The length of the shower seat 500 is preferably equal to either the width or the length of the corresponding shower module 100 with which the shower bench 500 will be installed. The lower edge of each sidewall 520 terminates in a common plane that either rests on the subfloor of the shower enclosure or connects to a corresponding peripheral edge of an optional bottom plate 540.

One sidewall 520 is divided into an upper portion 522 and a lower portion 524, wherein the lower portion is set back from the upper portion 522 along the entire length of the shower bench 500. The lower portion 524 is taller than the height of a sidewall 101, 102, 103, 104 of the shower module 100, and is set back from the upper portion 522 a distance slightly greater than the thickness of the sidewall 101, 102, 103, 104 of the shower module 100. In this manner, when the shower bench 500 is installed adjacent to the sidewall 101, 102, 103, 104 of the shower module 100 such that the sidewall 101, 102, 103, 104 of the shower module 100 resides within the setback area, thereby preventing the weight of the shower bench 500 from resting on the sidewall 101, 102, 103, 104 of the shower module 100. Additionally, as shown in FIG. 30, the outer surface of the upper portion 522 of the shower bench sidewall 520 should be flush with the inner surface of the sidewall 101 so that when tile 505 is installed to form the final shower enclosure, the transition between the shower module 100 and the shower bench 500 is unnoticeable.

In an alternative embodiment, as shown in FIG. 29, the shower bench 600 includes a triangular seating surface 610 connected to an upper edge of a sidewall 620 along each peripheral edge. The seating surface 610 may be any geometric shape suitable for forming a shower enclosure. Similar to shower bench 500, one sidewall 620 is divided into an upper portion 622 and a lower portion 624, wherein the lower portion is set back from the upper portion 622 along the entire length of the shower bench 600, allowing the shower bench 600 to be installed adjacent to a prefabricated shower module 100 without the weight of the shower bench resting upon the sidewall 101, 102, 103, 104 of the shower module 100.

In one embodiment of the present invention, the shower bench 500 may include at least one support rib 530 attached to at least one of the seating surface 510, any side wall 520, and the bottom wall, or any combination thereof, and extending downward to terminate coplanar with the lower edge of each sidewall. Each support or reinforcing rib runs parallel to, perpendicular to, or at an acute angle to, any side wall. 530

When installed, the seating surface 510 may be horizontal or pitched downwards toward the prefabricated shower module 100. Additionally, the seating surface 510 may include a horizontal lip 550 at least 1 inch tall and at least ⅜ inches wide along at least one peripheral edge to allow for a standard-sized wallboard to rest on the lip 550.

The seating surface and at least the upper portion 522 of the sidewall 520 adjacent to the sidewall 101, 102, 103, 104 of the shower module 100 have surfaces suitable for retaining tile, stone, or marble using an epoxy containing 100% resin solids or resin solids mixed with a solvent.

In one embodiment, the shower bench 500 may be constructed using similar polyurethane reaction injection molding techniques as described above in relation to the prefabricated shower module 100 and the modular curb 300. As in the case of the shower module 100 and the modular curb 300, the direction of flow of polymeric material should be unimpeded by the support ribs 530 during injection molding in order for the material to flow properly. Thus, the support ribs 530 should run parallel to, perpendicular to, or at an angle of 90° or less to the direction of flow of polymeric material. Additionally, to provide the proper support, the shower bench 500 should be molded from a polyurethane foam (which may also be fire-retardant) having a density of 12 pounds per cubic foot or greater.

Figure 31:
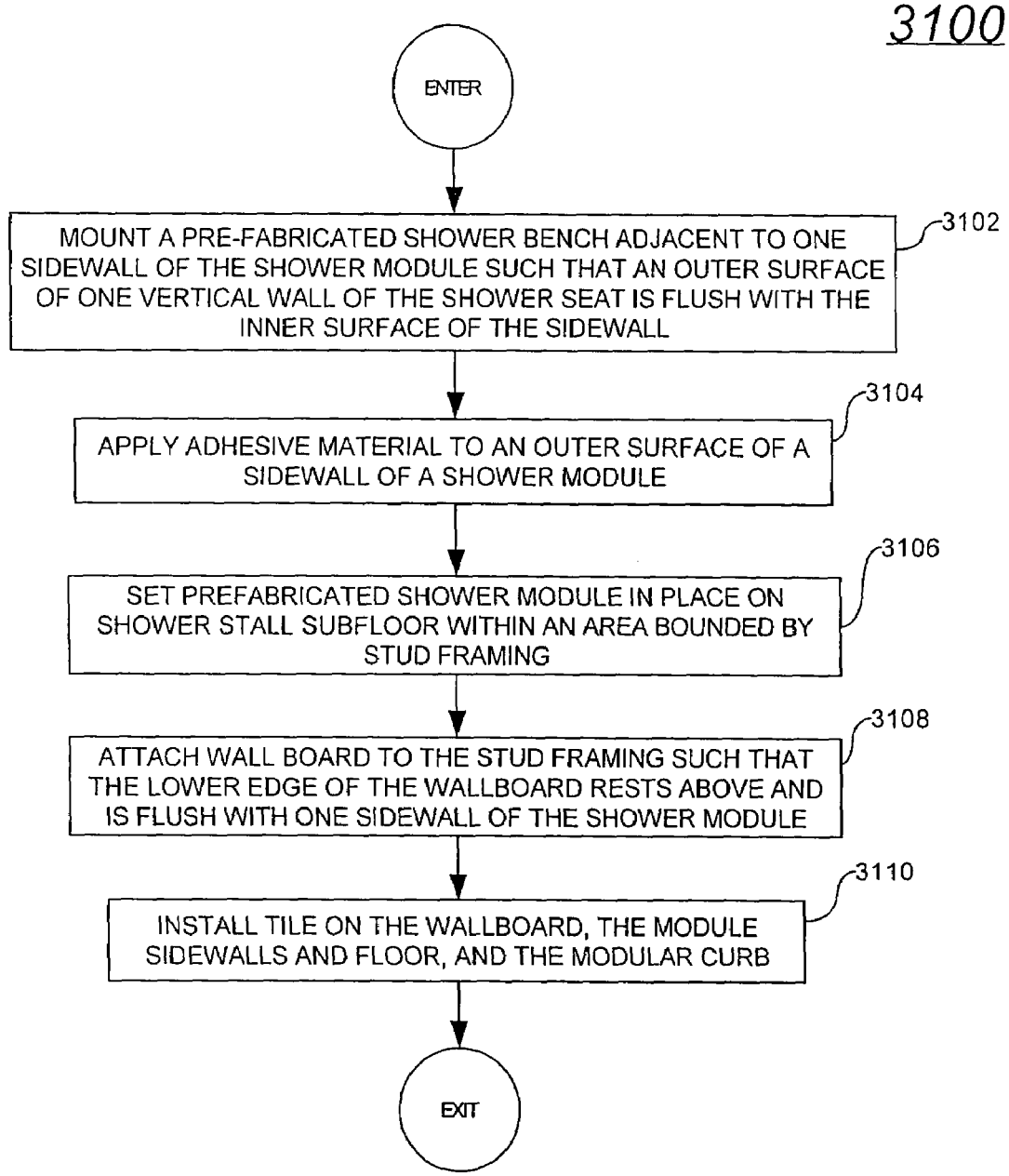
FIG. 31 is a logic flow diagram of various steps executed to implement a method for creating a tiled shower stall using a prefabricated leak-proof shower module and a prefabricated shower seat, in accordance with exemplary embodiments of the present invention.
Figure 32:
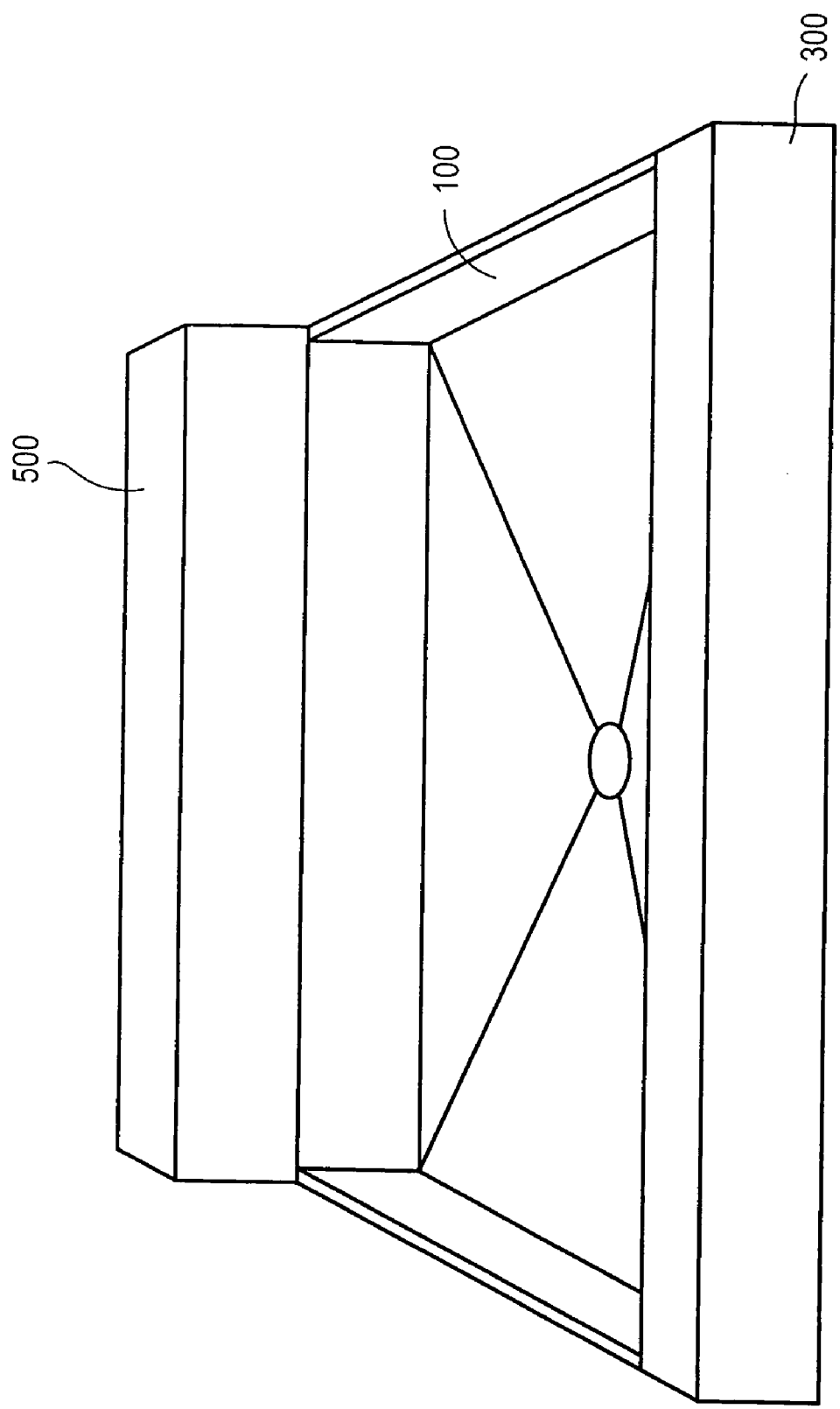
FIG. 32 is a front/top perspective view of a complete shower enclosure system constructed using a prefabricated shower module, a prefabricated modular curb, and a prefabricated shower bench, in accordance with exemplary embodiments of the present invention.

FIG. 31 illustrates an exemplary logic flow diagram 3100 executed by a shower enclosure installer to implement a method for constructing a tiled shower enclosure within an area bounded by a subfloor and stud framing using a prefabricated shower bench 500, a prefabricated shower module 100, and optionally, a prefabricated modular curb 300. FIG. 32 illustrates an exemplary finished shower enclosure created using embodiments of the prefabricated shower bench 500, the prefabricated shower module 100, and the prefabricated modular curb 300 as disclosed by the present invention. The installer begins by mounting (3102) a prefabricated shower bench 500, adjacent to the stud framing such that a bench sidewall 520 that has a lower portion 524 set back from an upper portion 522 is facing the area where the shower module 100 is to be installed. The shower bench may be fastened to the stud framing using traditional fastening techniques (e.g., braces, screws, nails, adhesives, etc.). Thus, when someone sits on the shower bench 500, the person's weight is supported by both the bench support ribs 540 and the stud framing and not distributed to the shower module 100.

Next, the installer applies (3104) a quantity of adhesive material on the subfloor within the area bounded by the stud framing and the shower bench 500, and sets (3106) the shower module 100 in place on the subfloor within the area bounded by the stud framing and the shower bench 500. The shower module 100 is positioned on the subfloor such that at least one module sidewall 101 is substantially adjacent to the stud framing, and a second module sidewall 102 rests underneath the lower portion 524 of the bench sidewall 520. The inner surface of the second module sidewall 102 is flush with an outer surface of the upper portion 522 of the bench sidewall 520, and the drain assembly is in fluid communication with the subfloor plumbing connection. The installer may also, optionally, attach a prefabricated modular curb 300 to a third sidewall 104 using techniques described, supra, in Section 3 or use a shower module 1400, 1500 with an integrated curb 140.

Finally, the installer attaches (3108) wallboard to the framing such that a lower edge of the wallboard rests above and is flush with the first module sidewall 101, and finishes the shower enclosure by installing (3110) tile, stone and/or marble on the wallboard, the module sidewalls 101, 102, 103, 104, the floor 110, the optional modular curb 300, and the prefabricated shower bench 500.

All features of the shower bench 500 and corresponding methods of installation described herein may be equally applied to creating a shower ledge simply by extending the height of the sidewalls 520.

As described above, the present invention encompasses a modular system for creating a tiled shower enclosure including one or more component pieces (e.g., a prefabricated shower module with or without an integrated curb, a prefabricated modular curb, a prefabricated shower bench, and a prefabricated ledge), and methods of manufacturing and installing the associated component pieces. With this invention, manufacturers may improve cycle times for creating component parts while reducing yield losses, thereby resulting in lower costs for higher quality products. Additionally, the system offers tremendous flexibility in creating numerous combinations of component pieces, thereby providing many more options for creating modular shower enclosures. The system may be installed in the field in a fraction of the time required using traditional prior art methods, which greatly assists installers and contractors when building multiple enclosures (e.g., newly constructed condominiums, apartment buildings, hotels, dormitories, prisons, pre-manufactured housing, etc.).

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions to become more pronounced are not to be construed as a critical, required, or essential feature or element of any or all the claims. The invention is defined solely by the appended claims including any amendments made while this application is pending and all equivalents of those claims as issued.

What is claimed:

1. A prefabricated modular curb suitable for use in constructing a tiled shower, the curb comprising:
   a mounting wall having an upper edge, a lower edge, a first end, a second end, an inner surface, and an outer surface, the outer surface for engaging a sidewall of a shower module;
   an exterior wall having an upper edge, a lower edge, a first end, a second end, an inner surface and an outer surface;
   a top wall having a first end and a second end, the top wall extending from the upper edge of the exterior wall to the upper edge of the mounting wall in a plane which is either substantially perpendicular to the mounting wall and to the exterior wall, or pitched downward from the exterior wall toward the mounting wall; and
   wherein the lower edge of the mounting wall and the lower edge of the exterior wall terminate in substantially a common plane.

2. The modular curb of claim 1, further comprising:
   at least one reinforcing curb rib connected to at least one of the exterior wall, the mounting wall, and the top wall.

3. The modular curb of claim 2, wherein:
   the least one reinforcing curb rib is connected perpendicularly to the exterior wall and to the mounting wall at the first end of the exterior wall and the first end of the mounting wall.

4. The modular curb of claim 2, wherein the at least one reinforcing rib is either parallel to, perpendicular to, or at an acute angle to, the mounting wall.

5. The modular curb of claim 2, wherein the modular curb is constructed using polyurethane reaction injection molding.

6. The modular curb of claim 2, wherein the at least one reinforcing curb rib is oriented substantially parallel to a direction of flow of polymeric material during injection molding.

7. The modular curb of claim 2, wherein the at least one reinforcing curb rib is oriented at an angle which is substantially 90° or less to a direction of flow of polymeric material during injection molding.

8. The modular curb of claim 2, wherein the at least on reinforcing rib is oriented at an angle which is less than 90° to a direction of flow of polymeric material during injection molding.

9. The modular curb of claim 2, wherein the modular curb is molded from a polyurethane foam having a density equal to or greater than 12 pounds per cubic foot.

10. The modular curb of claim 2, wherein the modular curb is molded from a fire-retardant polyurethane foam.

11. The modular curb of claim 1, further comprising:
a bottom wall extending from the lower edge of the exterior wall to the lower edge of the mounting wall in a plane substantially perpendicular to the mounting wall and to the exterior wall.

12. The modular curb of claim 1, wherein the top wall includes at least one ledge which projects from the upper edge of the mounting wall away from the top wall such that the mounting wall and ledge form a socket into which can be nested the sidewall of the shower module.

13. The modular curb of claim 12, wherein the exterior wall has a height greater than a height of the mounting wall such that the top wall is pitched to slope downwards toward the sidewall of the shower module when the modular curb is installed adjacent to the sidewall.

14. The modular curb of claim 1, wherein the top wall terminates beyond the outer surface of the mounting wall in a ledge having a width substantially equal to a width of at least a portion of the sidewall of the shower module.

15. The modular curb of claim 1, further comprising:
a first attachment structure located on the outer surface of the mounting wall for engaging a corresponding second attachment structure associated with the sidewall of the shower module.

16. The modular curb of claim 15, wherein the first attachment structure is at least one of a tab, a notch, a slot, a tongue, a groove, a ridge, a peg, an aperture, an interlocking clip, and an adhesive material.

17. The modular curb of claim 1, wherein the exterior wall and the top wall define surfaces adapted to receive at least one of tile, stone, and marble installed thereon.

18. The modular curb of claim 17, wherein the at least one of tile, stone, and marble are retained using an epoxy containing at least one of 100% resin solids and resin solids mixed with a solvent.

19. A prefabricated modular curb suitable for use in constructing a tiled shower, the curb comprising:
an outer mounting wall having an upper edge and being of a first height;
an inner mounting wall having an upper edge and being of a second height, wherein the second height is greater than the first height;
an exterior wall having an upper edge and being of a third height wherein the third height is greater than or equal to the second height; and
a top wall attached to the upper edge of the exterior wall, to the upper edge of the inner mounting wall, and to the upper edge of the outer mounting wall in a plane substantially perpendicular to the exterior wall, to the outer mounting wall and to the inner mounting wall such that the inner mounting wall is located at an intermediary point between the outer mounting wall and the exterior wall at a distance from the outer mounting wall slightly greater than a width of a sidewall of a shower module.

20. A method of manufacturing a prefabricated modular curb suitable for use in constructing a tiled shower, the method comprising:
providing a tool for creating the prefabricated modular curb, the tool including a cavity portion and a core portion which define a shape corresponding to a shape of the prefabricated modular curb to be formed;
placing at least one insert into a voided area of the tool corresponding to an end portion of the prefabricated modular curb, thereby preventing the polymeric material from filling the voided area and reducing a length of the prefabricated modular curb;
injecting a polymeric material into the tool to produce the prefabricated modular curb; and
removing the prefabricated modular curb from the tool.

21. The method of claim 20, further comprising the step of:
attaching the modular curb to a sidewall of a prefabricated shower module.

22. The method of claim 20, further comprising the steps of:
cutting the prefabricated modular curb to produce an excess portion and a remaining portion, the remaining portion having a length equal to or less than a length of a sidewall of a prefabricated shower module;
removing the excess portion; and
attaching the remaining portion to the sidewall.

* * * * *